(12) United States Patent
Shimakawa et al.

(10) Patent No.: US 12,298,566 B2
(45) Date of Patent: May 13, 2025

(54) OPTICAL FIBER CONNECTION STRUCTURE

(71) Applicant: SUMITOMO ELECTRIC INDUSTRIES, LTD., Osaka (JP)

(72) Inventors: Osamu Shimakawa, Osaka (JP); Hidehisa Tazawa, Osaka (JP); Masato Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 287 days.

(21) Appl. No.: 17/927,779

(22) PCT Filed: May 28, 2021

(86) PCT No.: PCT/JP2021/020508
§ 371 (c)(1),
(2) Date: Nov. 25, 2022

(87) PCT Pub. No.: WO2022/004220
PCT Pub. Date: Jan. 6, 2022

(65) Prior Publication Data
US 2023/0228950 A1    Jul. 20, 2023

(30) Foreign Application Priority Data

Jun. 29, 2020 (JP) .................. 2020-111739

(51) Int. Cl.
*G02B 6/32* (2006.01)
*G02B 6/38* (2006.01)

(52) U.S. Cl.
CPC ............. *G02B 6/32* (2013.01); *G02B 6/3853* (2013.01); *G02B 6/3874* (2013.01);
(Continued)

(58) Field of Classification Search
CPC ...... G02B 6/32; G02B 6/3853; G02B 6/3874; G02B 6/3885
See application file for complete search history.

(56) References Cited

U.S. PATENT DOCUMENTS 5,652,814 A    7/1997    Pan et al.
8,873,909 B1   10/2014   Wang et al.
(Continued)

FOREIGN PATENT DOCUMENTS

CN    111290075 A    6/2020
JP    H09-061683 A   3/1997
(Continued)

OTHER PUBLICATIONS

Dec. 28, 2023 Notice of Allowance issued in U.S. Appl. No. 17/927,815.
(Continued)

*Primary Examiner* — Omar R Rojas
(74) *Attorney, Agent, or Firm* — Oliff PLC

(57) ABSTRACT

An optical fiber connection structure includes: a multi-core fiber; a plurality of single-core fibers; a first lens having a focal length of f1 (mm); and a second lens having a focal length of f2 (mm). A core pitch of the multi-core fiber is P1 (μm), a mode field diameter on the first end face of each core is MFD1 (μm), a core pitch of multiple single-core fibers is P2 (μm), a mode field diameter of a light beam on the second end face of each core is MFD2 (μm), and the following formulas are satisfied.

$(P1/P2) \times 0.9 \le f1/f2 \le (P1/P2) \times 1.1$, and $(P1/P2) \times 0.9 \le MFD1/MFD2 \le (P1/P2) \times 1.1$

15 Claims, 20 Drawing Sheets

(52) U.S. Cl.
CPC ............ *G02B 6/3885* (2013.01); *G02B 6/327* (2013.01); *G02B 6/3845* (2013.01)

(56) References Cited

U.S. PATENT DOCUMENTS

| | | |
|---|---|---|
| 2007/0165981 A1 | 7/2007 | Tanaka et al. |
| 2010/0238559 A1 | 9/2010 | Tanaka |
| 2012/0020618 A1 | 1/2012 | Erdman et al. |
| 2019/0154925 A1 | 5/2019 | Kondo et al. |

FOREIGN PATENT DOCUMENTS

| | | |
|---|---|---|
| JP | 2003-167159 A | 6/2003 |
| JP | 2006-323421 A | 11/2006 |
| JP | 2007-193006 A | 8/2007 |
| JP | 2009-145427 A | 7/2009 |
| JP | 2013-065002 A | 4/2013 |
| JP | 2013-182222 A | 9/2013 |
| JP | 2016-061941 A | 4/2016 |
| JP | 2016-224183 A | 12/2016 |
| JP | 2018-136551 A | 8/2018 |
| WO | 2009/075168 A1 | 6/2009 |
| WO | 2016/189882 A1 | 12/2016 |

OTHER PUBLICATIONS

Tottori et al., "[Invited lecture] Multi-core fiber connection technology by spatial coupling", IEICE Technical Report, Feb. 2013.
Kobayashi et al., [Invited Talk] Multicore Fiber Coupled Devices for Spatial Optics and Their Scalability, IEICE Technical Report, Feb. 2014.
Tottori et al., Study of miniaturization of fan-in/fan-out devices using free space optics, IEICE Technical Report, Feb. 2015.

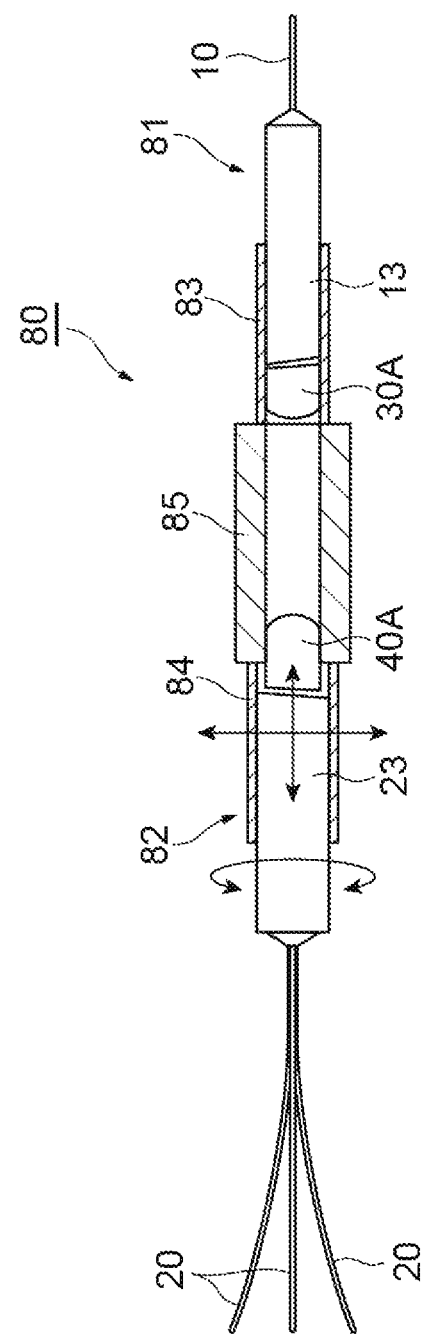

OPTICAL FIBER CONNECTION STRUCTURE

TECHNICAL FIELD

The present disclosure relates to an optical fiber connection structure.

This application is based upon and claims the benefit of priority from Japanese Patent Application No. 2020-111739, filed on Jun. 29, 2020, the entire contents of which are incorporated herein by reference.

BACKGROUND ART

Patent Literature 1 describes a multi-core fiber coupling device. The multi-core fiber coupling device includes a multi-core fiber (sometimes referred to as "MCF" below), a first lens, an optical functional element, the same number of prisms as the number of MCF cores, and a collimator including the same number of single-core fibers (hereinafter also referred to as "SCF") as the number of MCF cores. A light beam output from each core of the MCF is converted into collimated light beam by the first lens and spatially separated. Each spatially separated light beam is incident on each prism and is coupled to the SCF of each collimator in a state where a pitch between a plurality of optical paths in each prism is widened.

Non-Patent Literature 1 describes a spatially coupled structure of an MCF. This spatially coupled structure includes an MCF fixed to one end of a housing, a plurality of SMF collimators fixed to the other end of the housing, a lens provided inside the housing, and a plurality of parallelogram prisms. Light output from each core of the MCF is coupled to each SMF collimator via the lens and each of the plurality of parallelogram prisms.

Non-Patent Literature 2 describes a spatial optical system multi-core fiber coupling device. The device includes a 7-core MCF, a single lens, a deflection prism, a lens array, and an SMF array. The lens array includes the same number of lens elements as SMFs constituting the SMF array. In this device, a light beam output from each core of the MCF is coupled to each SMF of the SMF array via the single lens, the deflection prism, and each lens element of the lens array.

Non-Patent Literature 3 describes a core spacing conversion device. The device includes a first MCF, a second MCF, and two lenses interposed between the first MCF and the second MCF. A shape of core arrangement of the first MCF and a shape of core arrangement of the second MCF are similar to each other. A core spacing (pitch) of the first MCF and a pitch of the second MCF are different from each other. In this device, optical coupling with the same pitch is realized by performing magnification conversion of the MCFs having different pitches with the two lenses.

CITATION LIST

Patent Literature

Patent Literature 1: Japanese Unexamined Patent Publication No. 2013-182222

Non Patent Literature

Non-Patent Literature 1: IEICE Tech. Rep., vol. 112, no. 448, OFT2012-72, pp. 17-22, February 2013., "Connection technologies of multi-core fiber by space coupling", Optoquest, Tottori et al.

Non-Patent Literature 2: IEICE Tech. Rep., vol. 113, no. 448, OPE2013-211, pp. 35-40, Febryary 2014., "Multi-core fiber coupling devices using free space optics and their possible application to other functions", Optoquest, Kobayashi et al.

Non-Patent Literature 3: IEICE Tech. Rep., vol. 114, no. 452, OFT2014-78, pp. 113-116, February 2015., "Study of miniaturization of fan-in/fan-out devices using free space optics", Optoquest, Tottori et al.

SUMMARY OF INVENTION

An optical fiber connection structure according to one aspect of the present disclosure includes: a multi-core fiber; a plurality of single-core fibers arranged in parallel in a direction perpendicular to a longitudinal direction; a first lens facing a first end face which is a distal end face of the multi-core fiber and having a focal length of f1 (mm), and a second lens arranged between second end faces which are distal end faces of the plurality of single-core fibers and the first lens and having a focal length of f2 (mm). Arrangement of a center position of each core in a cross section perpendicular to the longitudinal direction of the multi-core fiber and arrangement of a center position of each core in a cross section perpendicular to the longitudinal direction of the plurality of single-core fibers are disposed so as to have similar shapes. When a pitch of a set of cores of the multi-core fiber is P1 ($\mu$m), and a mode field diameter (hereinafter also referred to as an "MFD") of a light beam having a specific wavelength on the first end face of each core has MFD1 ($\mu$m), and a pitch of a set of cores of the plurality of single-core fibers at positions corresponding to the set of cores of the multi-core fiber is P2 ($\mu$m), and an MFD of a light beam having the specific wavelength on the second end face of each core has MFD2 ($\mu$m), the following formulas are satisfied.

$$(P1/P2) \times 0.9 \leq f1/f2 \leq (P1/P2) \times 1.1, \text{ and}$$

$$(P1/P2) \times 0.9 \leq MFD1/MFD2 \leq (P1/P2) \times 1.1$$

BRIEF DESCRIPTION OF DRAWINGS

FIG. 20 is a diagram for explaining a method for assembling the optical fiber connection structure of FIG. 15.

DESCRIPTION OF EMBODIMENTS

Figure 1:
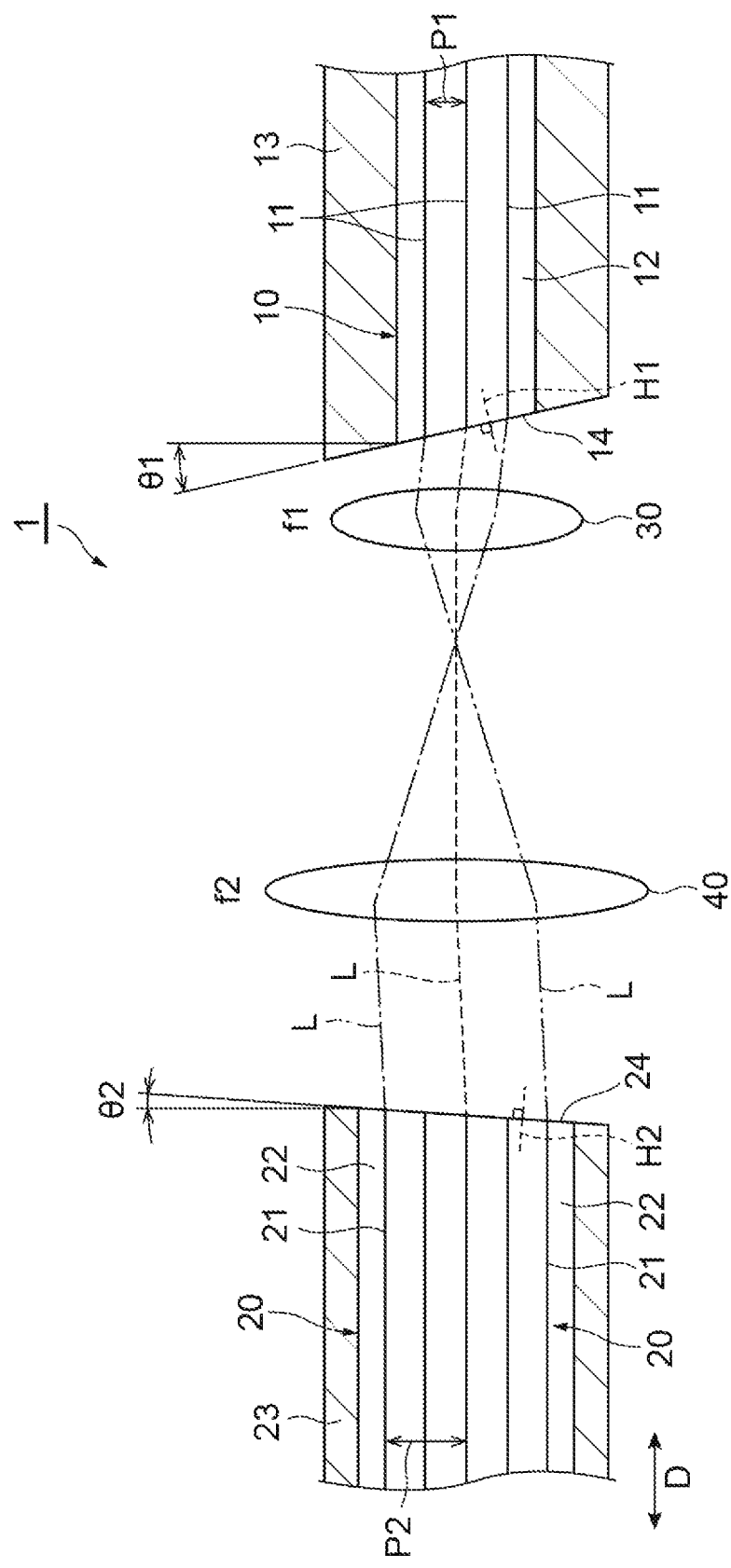
FIG. 1 is a diagram illustrating an optical fiber connection structure according to an embodiment.

By the way, in the related art, a multi-core fiber coupling structure and a space coupling structure of MCF include a plurality of prisms, and an SCF is a collimator attached with a lens. Therefore, the number of parts is large, which may cause an increase in size. In the above-mentioned spatial optical system multi-core fiber coupling device, special components such as a deflection prism and a lens array are required. In the above-mentioned core conversion device, when magnification conversion of the lens is performed together with a core pitch, an MFD also changes, so that mismatch of MFD for the light beam having the same wavelength between a pair of optical fibers occurs. Therefore, it is expected that optical loss will increase.

An object of the present disclosure is to provide an optical fiber connection structure capable of reducing optical loss.

According to the present disclosure, the optical loss can be reduced.

Description of Embodiments of the Present Disclosure

First, contents of the embodiments of the present disclosure is listed and described. An optical fiber connection structure according to one embodiment includes a multi-core fiber, a plurality of single-core fibers arranged in parallel in a direction perpendicular to a longitudinal direction, a first lens facing a first end face which is a distal end face of the multi-core fiber and having a focal length of f1 (mm), and a second lens arranged between second end faces which are distal end faces of the plurality of single-core fibers and the first lens and having a focal length of f2 (mm). Arrangement of a center position of each core in a cross section perpendicular to the longitudinal direction of the multi-core fiber and arrangement of a center position of each core in a cross section perpendicular to the longitudinal direction of the plurality of single-core fibers are disposed so as to have a similar shape. When a pitch of a set of cores of the multi-core fiber is P1 (μm) and an MFD of a light beam having a specific wavelength on the first end face of each core is MFD1 (μm), and a pitch of a set of cores of the plurality of single-core fibers at positions corresponding to the set of cores of the multi-core fiber is P2 (μm) and an MFD of a light beam having the specific wavelength on the second end face of each core is MFD2 (μm), the following formulas are satisfied.

$(P1/P2) \times 0.9 \leq f1/f2 \leq (P1/P2) \times 1.1$, and $(P1/P2) \times 0.9 \leq MFD1/MFD2 \leq (P1/P2) \times 1.1$ In this optical fiber connection structure, a pitch of each core of the multi-core fiber is P1, and an MFD of each core of the multi-core fiber is MFD1 (μm). A pitch of each core of the plurality of single-core fibers is P2, and an MFD of a light beam having the same specific wavelength on the second end face of each single-core fiber is MFD2 (μm). Assuming that the focal length of the first lens facing the multi-core fiber is f1 (mm) and the focal length of the second lens facing the single-core fiber is f2 (mm), (f1/f2) is within ±10% of (P1/P2). And (MFD1/MFD2) is within ±10% of (P1/P2). Therefore, since magnification conversion of the lens and the MFD is performed together with the core pitch, mismatch of the MFD between the multi-core fiber and the single-core fiber can be corrected. Therefore, optical loss can be reduced. Further, since this optical fiber connection structure includes the multi-core fiber, the plurality of single-core fibers, the first lens, and the second lens, special parts such as the above-mentioned deflection prism or lens array are not required. Therefore, an increase in the number of parts can be suppressed, and miniaturization can be realized.

Each of the plurality of single-core fibers may have a beam expansion portion capable of expanding an MFD of a light beam propagating in the core of the single-core fiber on the second end face. In this case, the second end face of each single-core fiber is an emission face and becomes an emission end. An MFD of a light beam propagating through each single-core fiber is expanded on the second end face. Therefore, the value of MFD2 can be increased according to the magnification of a light beam from the second lens to reduce the optical loss.

The beam expansion portion may be an MFD expansion portion in which an MFD is expanded in each single-core fiber.

The beam expansion portion may be a GRIN lens or a graded index (GI) fiber connected to each single-core fiber. In this case, the end face of the GRIN lens or the GI fiber not connected to each single-core fiber is an emission face of each single-core fiber and becomes an emission end. When an outer diameter of the GRIN lens or the GI fiber matches the outer diameter of the single-core fiber, connection of the GRIN lens or the GI fiber to the single-core fiber can be easily performed.

The beam expansion portion may be an optical fiber having a core having a diameter larger than that of the single-core fiber. The MFD may be expanded from the single-core fiber toward the optical fiber in the region including an interface between the single-core fiber and the optical fiber. In this case, an end face of an optical fiber having a core having a diameter larger than that of the core of the single-core fiber and being not connected to the single-core fiber is an emission face of each single-core fiber and becomes the emission end.

The normal line of the second end face may be inclined with respect to an optical axial direction of the single-core fiber. The normal line of the first end face may be inclined with respect to the optical axial direction. When the first lens and the second lens have the same refractive index and an inclination angle of the normal line of the first end face with respect to the optical axial direction is θ1 and an inclination angle of the normal line of the second end face with respect to the optical axial direction is θ2, the following formula may be satisfied.

$(f1/f2) \times 0.8 \leq \theta2/\theta1 \leq (f1/f2) \times 1.2$.

In this case, the optical axes of both the single-core fiber and the multi-core fiber can be close to each other in parallel.

The first lens and the second lens may be plano-convex lenses having curved surfaces facing each other. In this case, the inexpensive plano-convex lens can be used, and the assembling can be easily performed.

The first lens and the second lens may be GRIN lenses. In this case, by using the GRIN lens having a planar shape, there is an advantage that a handling and assembling can be easily performed.

The first lens and the second lens may be aspherical lenses. In this case, the coupling efficiency between the multi-core fiber and the single-core fiber can be further increased, so that the coupling can be performed with lower loss.

Each of the plurality of single-core fibers may have a reduced diameter. In this case, a magnification rate of the second lens can be lower by using the single-core fiber having a small diameter or using the single-core fiber having a small diameter by a chemical etching or the like.

The above-mentioned optical fiber connection structure includes a first collimator in which the multi-core fiber and the first lens are integrated, a second collimator in which the plurality of single-core fibers and the second lens are integrated, and a tubular member into which the first collimator and the second collimator are inserted so that the first lens and the second lens face each other. The first collimator and the second collimator may be fixed to the tubular member with adhesive in a state of being inserted into the tubular member.

The above-mentioned optical fiber connection structure may include the first collimator in which the multi-core fiber and the first lens are integrated, the second collimator in which the plurality of single-core fibers and the second lens are integrated, and the metal tube fixing the first collimator and the second collimator by welding so that the first lens and the second lens face each other.

The above-mentioned optical fiber connection structure may include a first optical fiber unit having the multi-core fiber and a second optical fiber unit having the plurality of single-core fibers. The above-mentioned optical fiber connection structure further includes a first lens unit including the first lens and being fixed to the first optical fiber unit by welding, a second lens unit including the second lens and being fixed to the second optical fiber unit by welding, and a metal tube fixing the first lens unit and the second lens unit by welding so that the first lens unit and the second lens unit face each other.

Details of Embodiments of the Present Disclosure

Specific examples of the optical fiber connection structure of the present disclosure are described below with reference to the drawings. It is noted that the present invention is not limited to the examples described later, but is indicated by the scope of the claims and is intended to include all modified examples within the scope of the claims and the scope equivalent thereto. In the description of the drawings, the same or corresponding elements are denoted by the same reference numerals, and duplicate description is omitted as appropriate. The drawings may be partially simplified or exaggerated for ease of the understanding, and dimensional ratios and angles are not limited to those of the drawings.

FIG. 1 is a diagram illustrating an optical fiber connection structure 1 according to an embodiment. The optical fiber connection structure 1 constitutes, for example, a fan-in/fan-out device (FIFO) of a lens-coupled multi-core fiber. It is noted that the multi-core fiber is referred to as an MCF, and the single-core fiber is referred to as an SCF. The optical fiber connection structure 1 includes an MCF 10, a plurality of SCFs 20, a first lens 30 interposed between the MCF 10 and the plurality of SCFs 20, and a second lens 40 interposed between the plurality of SCFs 20 and the first lens 30.

The MCF 10 includes a plurality of (for example, seven) cores 11 and a cladding 12, and each SCF 20 includes a core 21 and a cladding 22. It is noted that, for simplifying the drawings, in FIG. 1 and FIGS. 7 and 8 described later, the core of the optical fiber is represented with a line, and depiction of a boundary portion between the core and the cladding is omitted. On the other hand, in FIGS. 2 to 6 described later, the core is depicted as having a width. The optical fiber connection structure 1 is a fan-in/fan-out device that separates a light beam L passing through the MCF 10 into the plurality of SCFs 20 or couples a light beam L passing through each of the plurality of SCFs 20 into one MCF 10. The light beam L is a light beam having a wavelength in, for example, a 1.55 µm band.

For example, the optical fiber connection structure 1 may be used for the optical amplifier that divides a light beam L passing through each core 11 of the MCF 10 toward each of the plurality of SCFs 20 and amplifies each divided light beam L. The optical fiber connection structure 1 may be used for an optical transmitter that transmits a light beam L from each of the plurality of SCFs 20 or an optical receiver that receives the light beam L from each of the plurality of SCFs 20.

In the optical fiber connection structure 1, the MCF 10, the first lens 30, the second lens 40, and the SCF 20 are arranged in this order so as to be aligned along an optical axial direction D in which the optical axis of the SCF 20 extends. The MCF 10 and the SCF 20 are optically coupled (spatially coupled) via a space.

Figure 2:
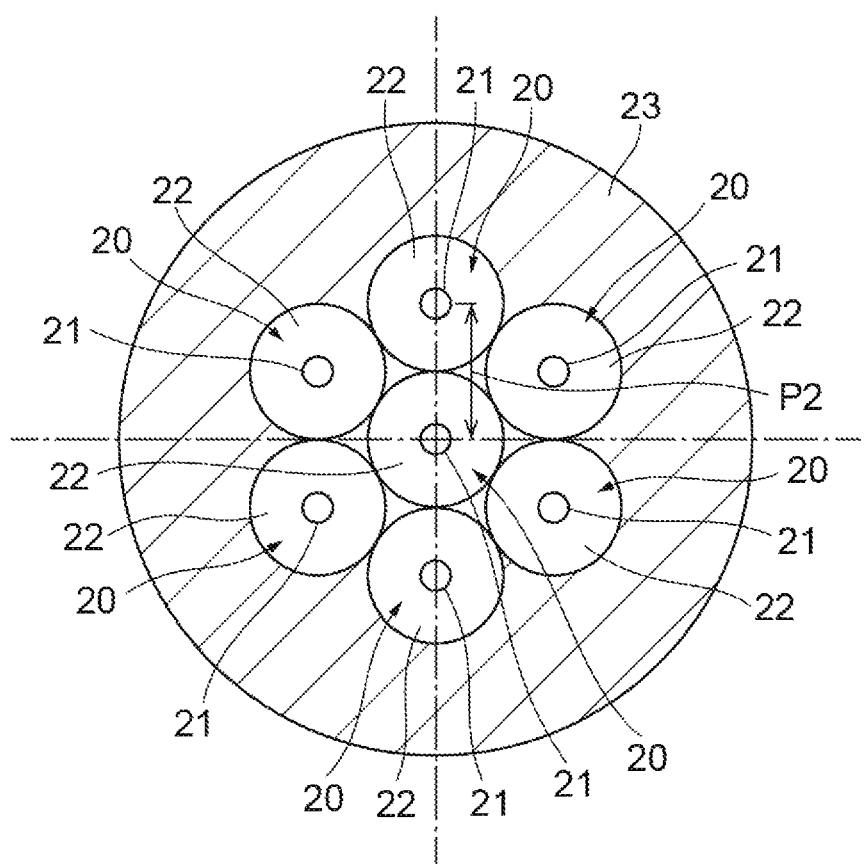
FIG. 2 is a diagram illustrating a plurality of SCFs of the optical fiber connection structure of FIG. 1.

FIG. 2 is a cross-sectional view of the SCF 20 obtained by cutting the SCF 20 in a plane perpendicular to the optical axial direction D. As illustrated in FIGS. 1 and 2, for example, a plurality of the SCFs 20 are bundled in the ferrule 23. As an example, the ferrule 23 is filled with the seven SCFs 20. In a cross section of the plurality of SCFs 20, the six SCFs 20 are arranged so as to surround the one SCF 20 with one SCF 20 as a center. In the cross section of the plurality of SCFs 20, the seven SCFs 20 are arranged in a triangular lattice pattern.

Figure 3:
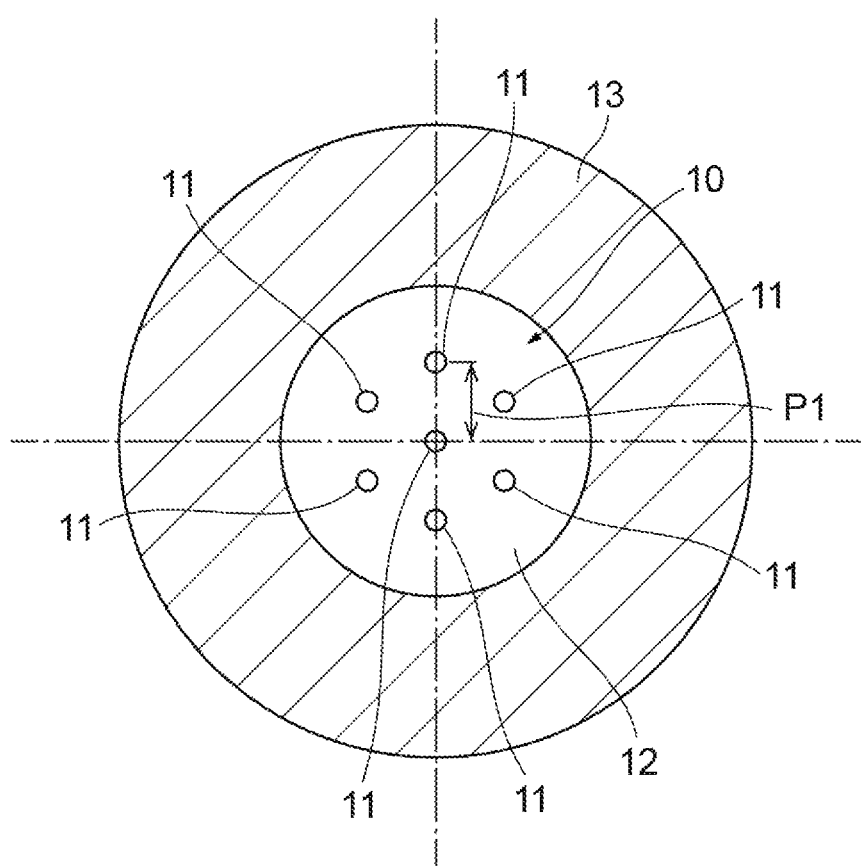
FIG. 3 is a diagram illustrating an MCF of the optical fiber connection structure of FIG. 1.

FIG. 3 is a cross-sectional view of the MCF 10 obtained by cutting the MCF 10 in the plane perpendicular to the optical axial direction D. As illustrated in FIGS. 1 and 3, the MCF 10 is terminated, for example, in the ferrule 13. In a cross section of the MCF 10 cut in the plane perpendicular to the optical axial direction D, the six cores 11 are arranged so as to surround the one core 11 with one core 11 as a center. In the cross section of the MCF 10, the seven cores 11 are disposed in a triangular lattice pattern.

In a cross section cut along the plane perpendicular to the optical axial direction D, the arrangement shape of the plurality of cores 21 of the SCF 20 and the arrangement shape of the plurality of cores 11 of the MCF 10 are similar to each other. For example, when a pitch of the core 11 of the MCF 10 is P1 (µm) and a pitch of the core 21 of the SCF 20 is P2 (µm), P2 is larger than P1. For example, P2 corresponds to the diameter of the SCF 20 (cladding 22).

As an example, P1 is 42 (µm), and P2 is 126 (µm). When the MFD of the light beam having the specific wavelength at the emission end of the core 11 of the MCF 10 is MFD1 (µm) and the MFD of the light beam having the same specific wavelength at the emission end of the core 21 of the SCF 20 is MFD2 (µm), the MFD2 is larger than the MFD1.

As an example, MFD1 is 10 (μm), and MFD2 is 30 (μm). P1, P2, MFD1, and MFD2 satisfy the following Formula (1).

$$(P1/P2) \times 0.9 \leq MFD1/MFD2 \leq (P1/P2) \times 1.1 \qquad (1)$$

The MCF 10 has the first end face 14 facing the first lens 30 side. For example, the first end face 14 is flat and is inclined at the angle θ1 with respect to the plane perpendicular to the optical axial direction D. A normal line H1 of the first end face 14 is inclined at the angle θ1 with respect to the optical axial direction D. The SCF 20 has a second end face 24 facing the second lens 40 side. Similarly to, for example, the first end face 14, the second end face 24 has a flat shape, and a normal line H2 of the second end face 24 is inclined at the angle θ2 with respect to the optical axial direction D.

The first lens 30 is arranged at the position facing the MCF 10 along the optical axial direction D. The first lens 30 collects a plurality of light beams L output from the plurality of cores 11 of the MCF 10 on the side opposite to the MCF 10. The second lens 40 is arranged at the position facing the SCF 20 along the optical axial direction D. Both the first lens 30 and the second lens 40 are, for example, convex lenses. When the first lens 30 and the second lens 40 are aspherical lenses, the loss of light beam L can be reduced, which contributes to the reduction of optical loss.

Assuming that a focal length of the first lens 30 is f1 (mm) and a focal length of the second lens 40 is f2 (mm), for example, f2 is larger than f1. Further, the second lens 40 may be larger than the first lens 30. Further, the above-mentioned P1 and P2 and f1 and f2 satisfy the relationship of the following Formula (2).

$$(P1/P2) \times 0.9 \leq f1/f2 \leq (P1/P2) \times 1.1 \qquad (2)$$

Further, the above-mentioned θ1 and θ2 and f1 and f2 may satisfy the following Formula (3).

$$(f1/f2) \times 0.8 \leq \theta2/\theta1 \leq (f1/f2) \times 1.2 \qquad (3)$$

As described above, when P1 is 42 (μm), P2 is 126 (μm), MFD1 is 10 (μm), and MFD2 is 30 (μm), (P1/P2)=(MFD1/MFD2)=1/3, so that the above-mentioned Formula (1) is satisfied. In this case, the magnification of the SCF 20 with respect to the MCF 10 is expanded to 3 times. Further, since the diameter of the general SCF 20 (cladding 22) is 125 (μm), the Formula (1) is satisfied in this case as well.

Figure 4:
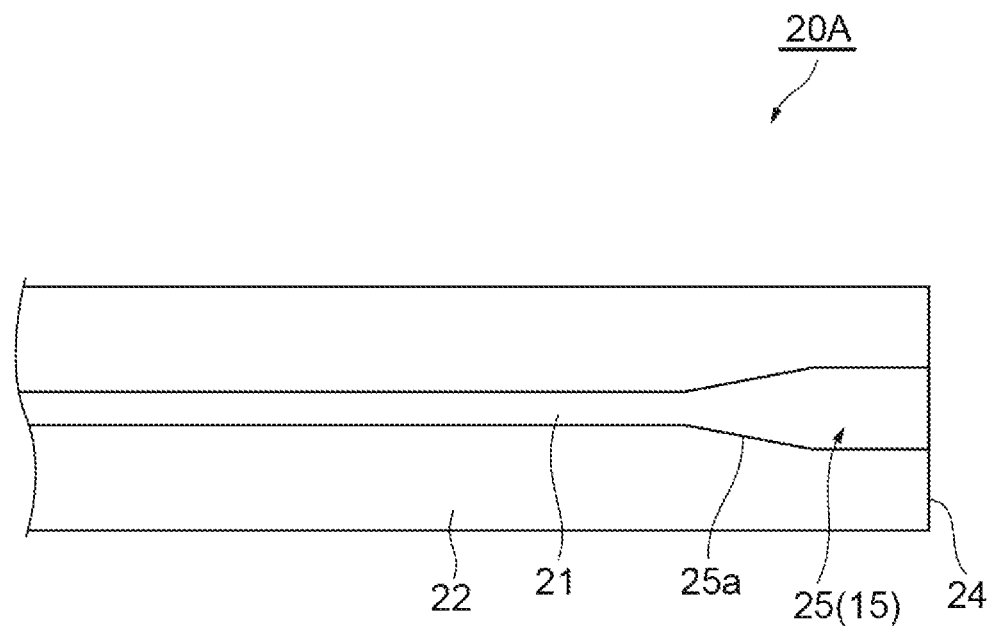
FIG. 4 is a diagram illustrating an example of MFD expansion portion of the SCF.

As described above, as one of the means for allowing MFD2 to be larger than MFD1, it is considered to use a thermally expanded core (TEC) fiber 20A as an SCF 20 as illustrated in FIG. 4. The TEC fiber 20A includes an MFD expansion portion 25 in which the MFD of the core 21 is expanded on the second end face 24. For example, the MFD expansion portion 25 includes a tapered portion 25a in which the MFD of the core 21 is expanded in a tapered shape. In this case, since the MFD of the core 21 is expanded on the second end face 24, an MFD of a light beam propagating in the SCF 20 is expanded on the MFD expansion portion 25 in the direction perpendicular to the optical axial direction D, the state where the MFD 2 is 30 (μm) is easily realized. The MFD expansion portion 25 function as a beam expansion portion 15.

Herein, considering a direction of a light beam from the inside of the SCF 20 toward the second end face 24 as a reference, the beam diameter in the vicinity of the second end face 24 being "expanded" with respect to the beam diameter in the SCF 20 is referred to as "beam expansion". However, in a case of considering a direction of a light beam from the second end face 24 toward the inside of the SCF 20 as a reference, the beam diameter in the SCF 20 is "reduced" with respect to the beam diameter in the vicinity of the second end face 24. That is, this portion becomes a "beam reduction portion".

In the above description, the example in which P1 is 42 (μm), P2 is 126 (μm), MFD1 is 10 (μm), and MFD2 is 30 (μm) is described. However, the values of P1, P2, MFD1, and MFD2 are not limited to the above. For example, when P1 which is a pitch of the core 11 of the MCF 10 is 35 (μm) and is expanded three times as described above, P2 which is a pitch of the core 21 of the SCF 20 can be 105 (μm) is.

The SCF 20 may be, for example, a reduced-diameter optical fiber having a diameter (P2) of 80 (μm). When the SCF 20 is a reduced-diameter optical fiber as described above, a magnification rate of the lens from the first lens 30 to the second lens 40 can be lower in order to satisfy the above-mentioned Formula (2).

In the present disclosure, the "being a reduced-diameter" SCF includes both using the SCF having a small diameter and reducing the diameter of the SCF by processing. As the using the SCF having a small diameter, there is exemplified using the SCF having a diameter of less than 125 μm. Further, as the reducing the diameter of the SCF by processing, there is exemplified reducing the diameter of the SCF by a chemical etching processing using buffered hydrofluoric acid liquid. The "reduced-diameter" SCF further includes both an SCF with the overall length being a reduced diameter and an SCF with a partially reduced diameter. Further, in a portion where "the SCF has a reduced diameter", the diameter of the SCF may be smaller than the diameter of the MCF 10.

Figure 5:
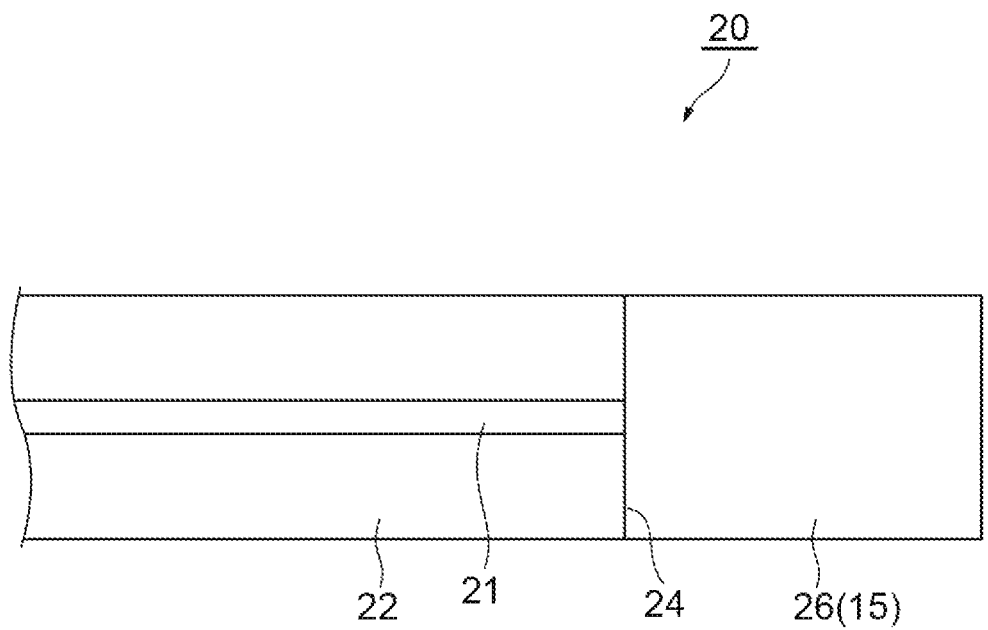
FIG. 5 is a diagram illustrating an example of GRIN lens of the SCF.

The beam expansion portion 15 of the SCF 20 is not limited to the MFD expansion portion 25 of the TEC fiber 20A. As illustrated in FIG. 5, the beam expansion portion 15 may be a GRIN lens 26 attached to the second end face 24 of the SCF 20. The GRIN lens 26 is fusion-splice to, for example, the second end face 24 of the SCF 20. In this case, the end face (the end face of the GRIN lens 26 on the side opposite to the second end face 24, and the right end face in FIG. 5) of the GRIN lens 26 on the side not spliced to the SCF 20 becomes an emission face and becomes an emission end. When the diameter of the GRIN lens 26 matches the diameter of the SCF 20, the fusion splicing of the GRIN lens 26 to the SCF 20 can be easily performed.

Figure 6:
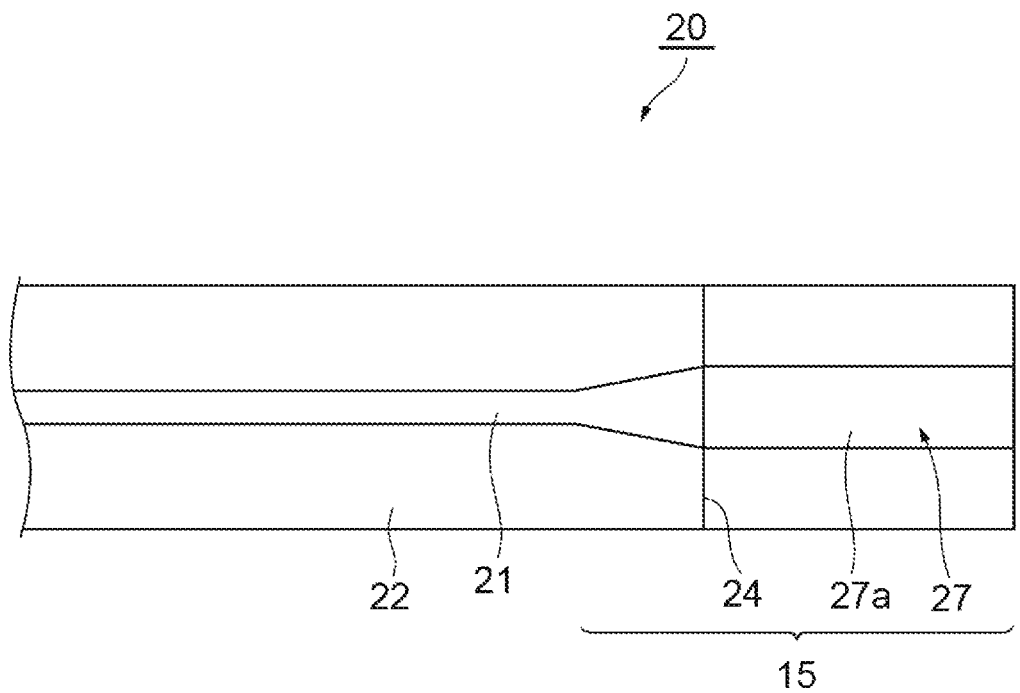
FIG. 6 is a diagram illustrating another optical fiber connected to the SCF.

It is noted that a GI fiber (graded index type fiber) may be provided instead of the GRIN lens 26. Further, as illustrated in FIG. 6, the beam expansion portion 15 of the SCF 20 may be an optical fiber 27 having a core 27a having a diameter larger than that of the core 21 of the SCF 20. An end face (an end face of the optical fiber 27 on the side opposite to the second end face 24 and the right end face in FIG. 6) of the optical fiber 27 which is, for example, fusion-spliced to the SCF 20 and not spliced to the SCF 20 in the optical fiber 27 is an emission face and becomes an emission end. Further, thermally expanded core (TEC) treatment is performed on the vicinity of the second end face 24 which is an interface of the SCF 20 with the optical fiber 27. In this case, the vicinity of the second end face 24 of the TEC-treated SCF 20 and the optical fiber 27 are the beam expansion portions 15.

Figure 7:
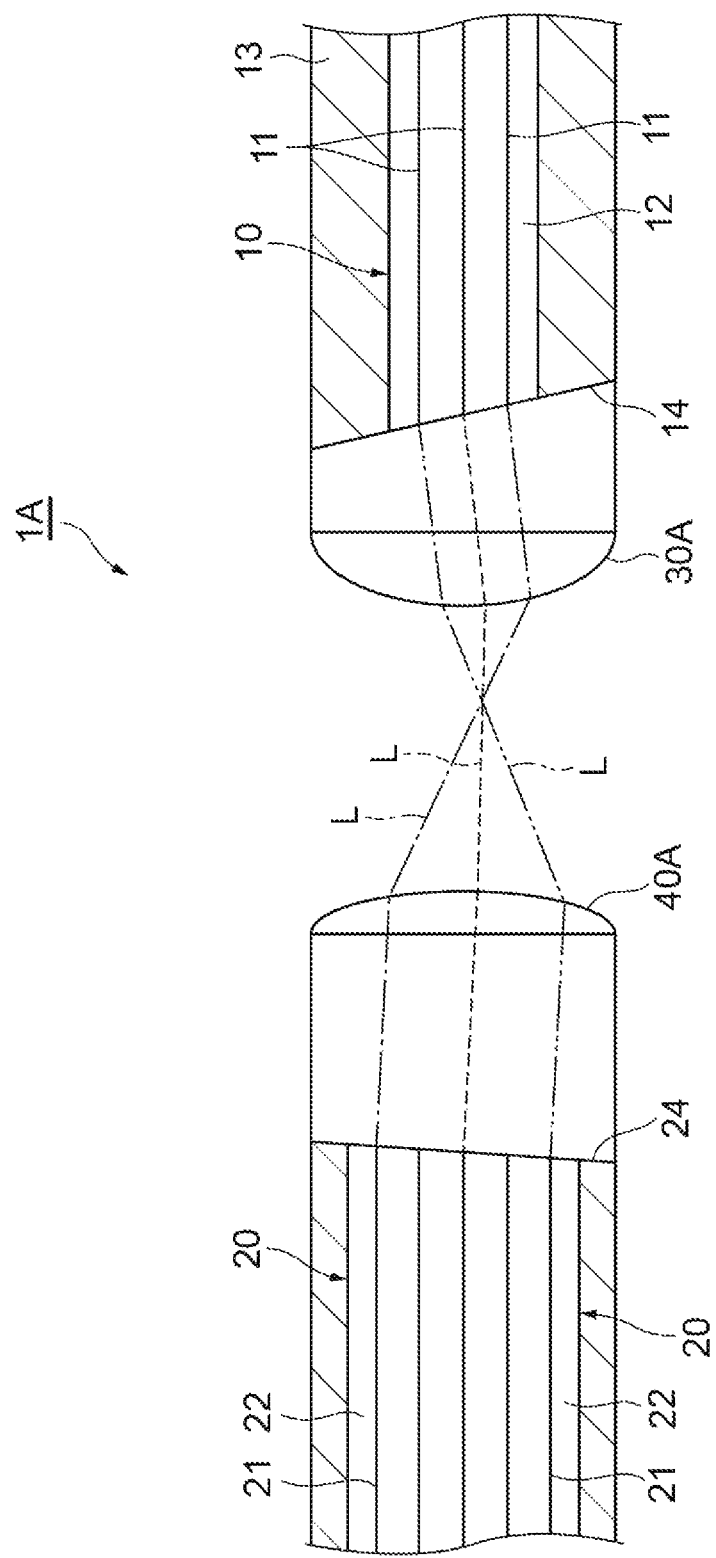
FIG. 7 is a diagram illustrating an optical fiber connection structure according to a modified example.
Figure 8:
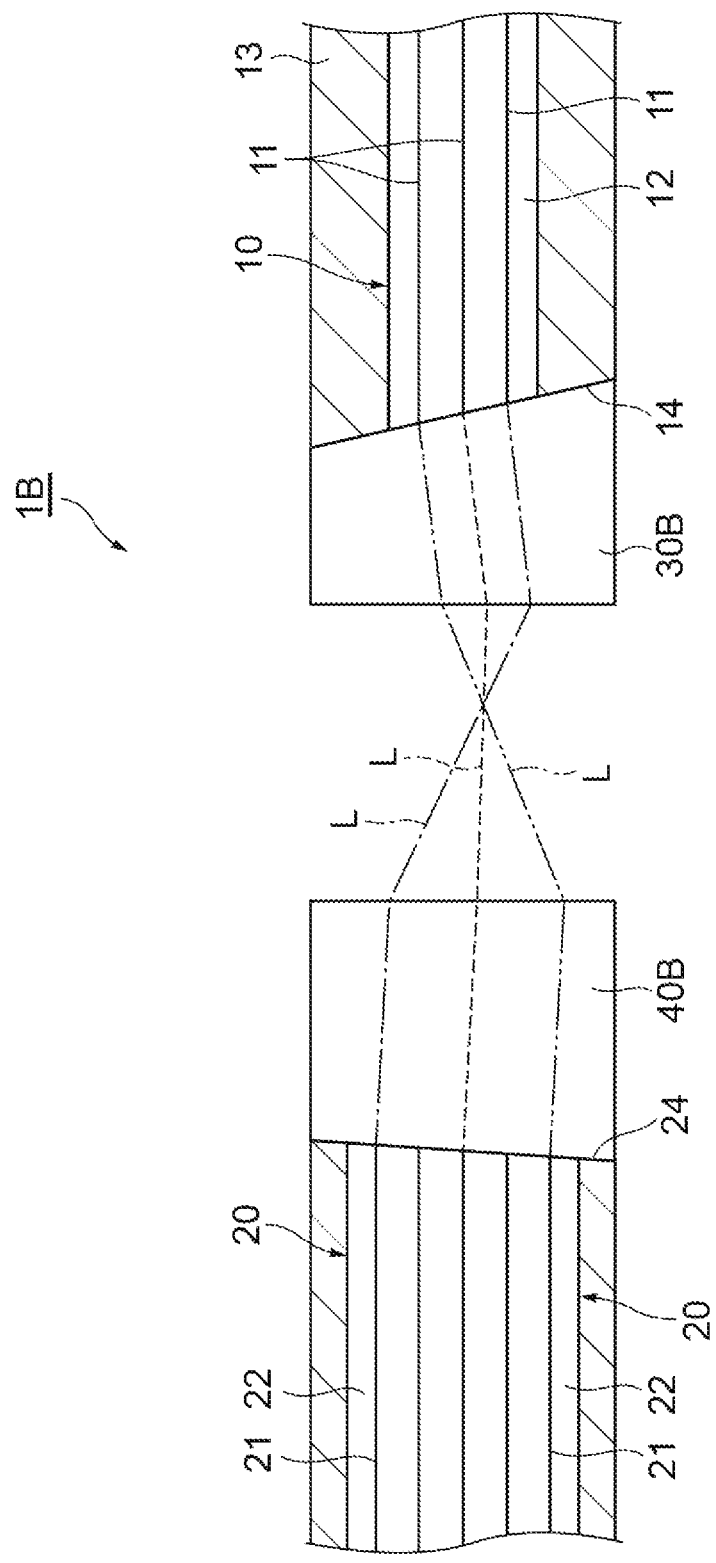
FIG. 8 is a diagram illustrating an optical fiber connection structure according to another modified example.

FIGS. 7 and 8 illustrate optical fiber connection structures 1A and 1B according to a modified example. The optical fiber connection structure 1A includes a first lens 30A and a second lens 40A which are cylindrical plano-convex lenses instead of the first lens 30 and the second lens 40 which are biconvex lenses. For example, one end portion of each of the first lens 30A and the second lens 40A has a convex lens shape. Further, the first lens 30A and the second lens 40A have a cylindrical portion following a convex lens shaped portion and a flat portion located in the other end portion. The first lens 30A is connected to the first end face 14 of the MCF 10 in the flat portion, and the second lens 40A is connected to the second end face 24 of the SCF 20 in the flat portion. When the outer diameters of the cylindrical portions of the first lens 30A and the second lens 40A match the outer diameters of the ferrules 13 and 23, respectively, connection of the first lens 30A and the MCF 10 and connection of the second lens 40A and the SCF 20 can be easily performed.

An optical fiber connection structure 1B includes a first lens 30B and a second lens 40B which are GRIN lenses instead of the first lens 30 and the second lens 40. For example, antireflection (AR) coating may be performed between the first lens 30B and the first end face 14 of the MCF 10, and a minute empty gap may be provided. Further, adhesive (as an example, a gel-like material) may be interposed between the first lens 30B and the first end face 14. The same applies to the space between the second lens 40B and the second end face 24 of the SCF 20.

As described above, when the first lens 30A which is a cylindrical plano-convex lens and the first lens 30B which is a GRIN lens are used, an outer diameter of the first lens 30A or an outer diameter of the first lens 30B is allowed to match an outer diameter of the ferrule 13 terminating the MCF 10, the first lenses 30A and 30B with respect to the MCF 10 can be easily position-aligned. For example, the ferrule 13 and the first lens 30A are inserted into a glass tube, so that axis aligning with respect to the MCF 10 can be performed. The same effect as described above can be obtained from the second lens 40A and the second lens 40B.

Figure 9:
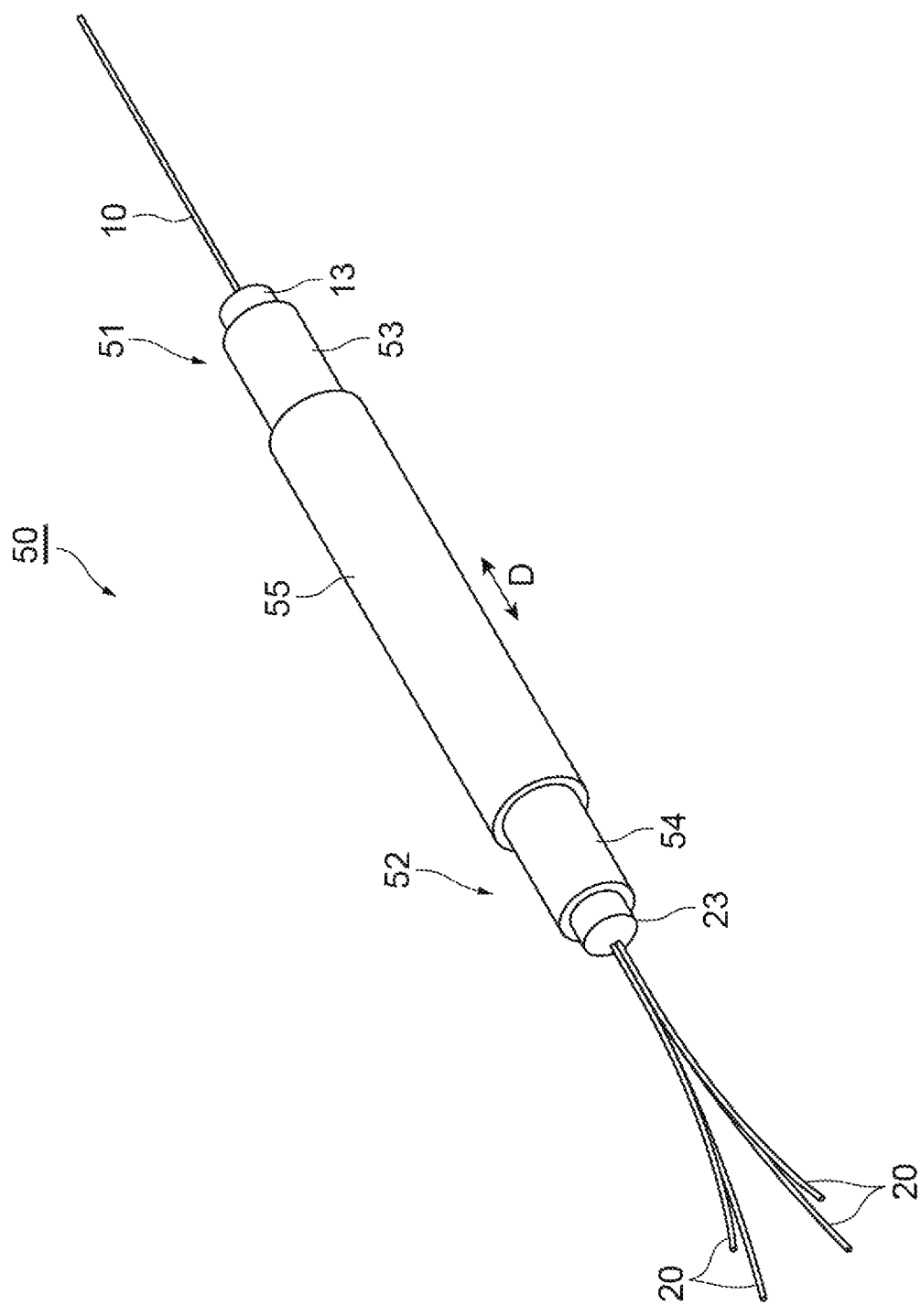
FIG. 9 is a perspective view illustrating an example of an assembled optical fiber connection structure.
Figure 10:
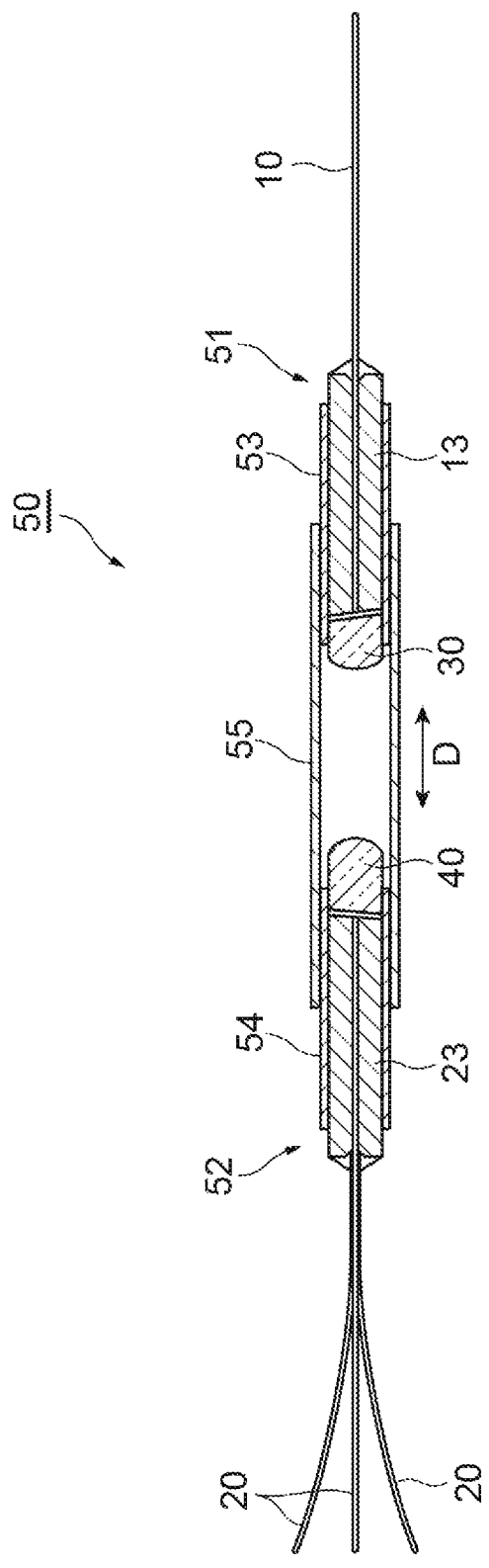
FIG. 10 is a cross-sectional view of the optical fiber connection structure of FIG. 9.

Next, an example of an assembled optical fiber connection structure is described. As illustrated in FIGS. 9 and 10, an optical fiber connection structure 50 includes a first collimator 51 in which an MCF 10, a ferrule 13, a first lens 30 and a sleeve 53 are integrated, a second collimator 52 in which a plurality of SCFs 20, a ferrule 23, a second lens 40 and a sleeve 54 are integrated, and a tubular member 55 in which the first collimator 51 and the second collimator 52 are connected to each other. The tubular member 55 is, for example, a glass tube.

In the first collimator 51, the first lens 30 is exposed from one side of the sleeve 53, and the ferrule 13 terminating the MCF 10 is exposed from the other side of the sleeve 53. The MCF 10 is extended from the ferrule 13 to the opposite side of the first lens 30 and the tubular member 55. In the second collimator 52, similarly to the first collimator 51, the second lens 40 is exposed from one side of the sleeve 54, and the ferrule 23 that bundles and terminates the plurality of SCFs 20 is exposed from the other side of the sleeve 54. The plurality of SCFs 20 are extended from the ferrule 23 to the opposite side of the second lens 40 and the tubular member 55.

Each of the first collimator 51 and the second collimator 52 configured as described above is fixed to the tubular member 55 so that the first lens 30 and the second lens 40 face each other along the optical axial direction D. For example, each of the first collimator 51 and the second collimator 52 is fixed to the tubular member 55 with adhesive.

With respect to a method for assembling the optical fiber connection structure 50, first, the first collimator 51, the second collimator 52, and the tubular member 55 are prepared. Then, the first collimator 51 is inserted from one side of the tubular member 55 so that the first lens 30 enters the inside of the tubular member 55, and the second collimator 52 is inserted into from the other side of the tubular member 55 so that the second lens 40 enters the inside of the tubular member 55. Then, one of the first collimator 51 and the second collimator 52 is fixed to the tubular member 55 with adhesive, and the other of the first collimator 51 and the second collimator 52 is center-aligned and then fixed to the tubular member 55 with adhesive.

The above-described center-aligning is performed in six directions of an X direction, a Y direction, a Z direction, a θx direction, a θy direction, and a θz direction. The Z direction is the optical axial direction D, and the X direction and the Y direction are directions perpendicular to the Z direction. Each of the θx direction, the θy direction, and the θz direction indicates a direction around the X axis, a direction around the Y axis, and a direction around the Z axis. The above adhesive is, for example, a UV (Ultra Violet) curable adhesive.

Figure 11:
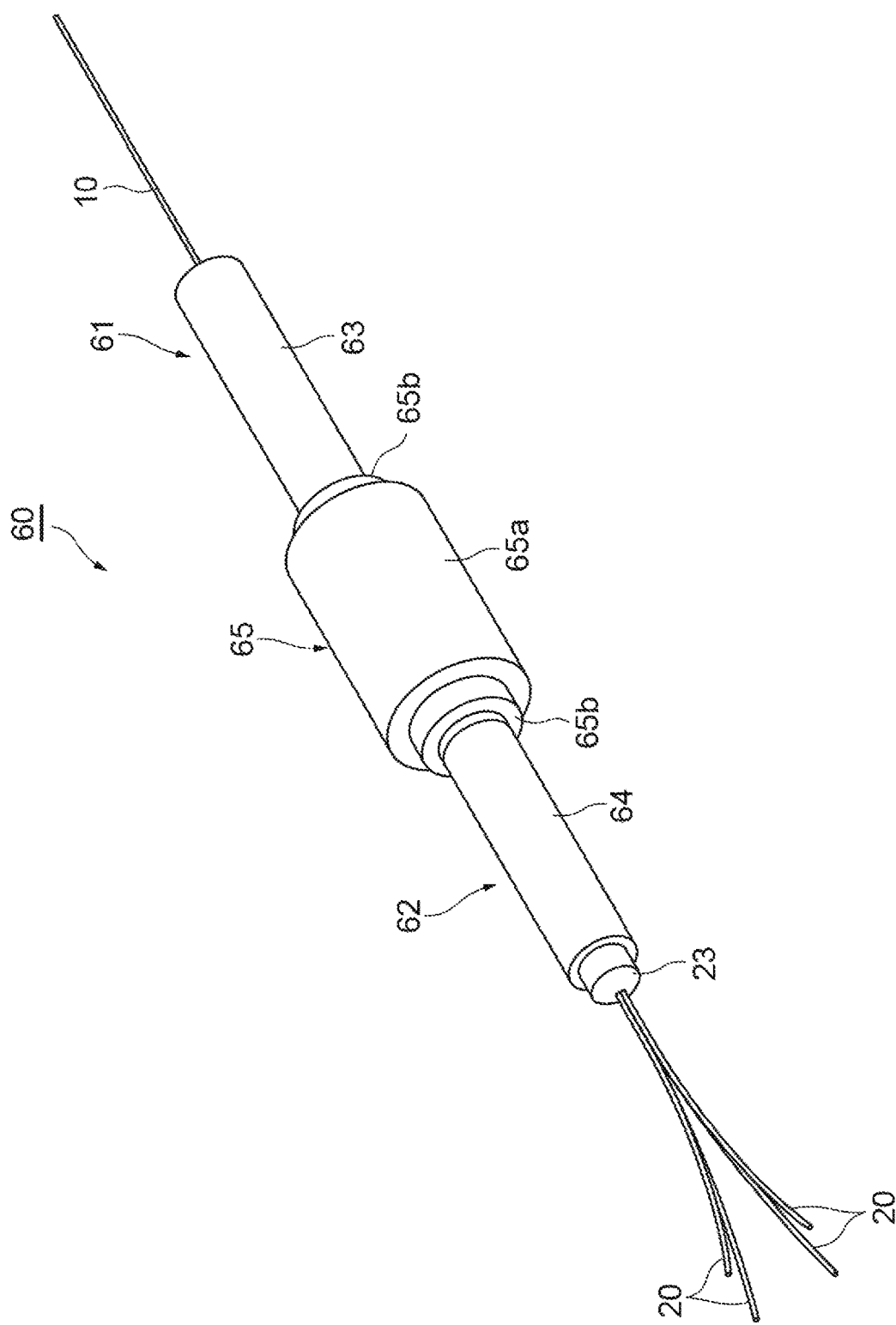
FIG. 11 is a perspective view illustrating another example of the assembled optical fiber connection structure.
Figure 12:
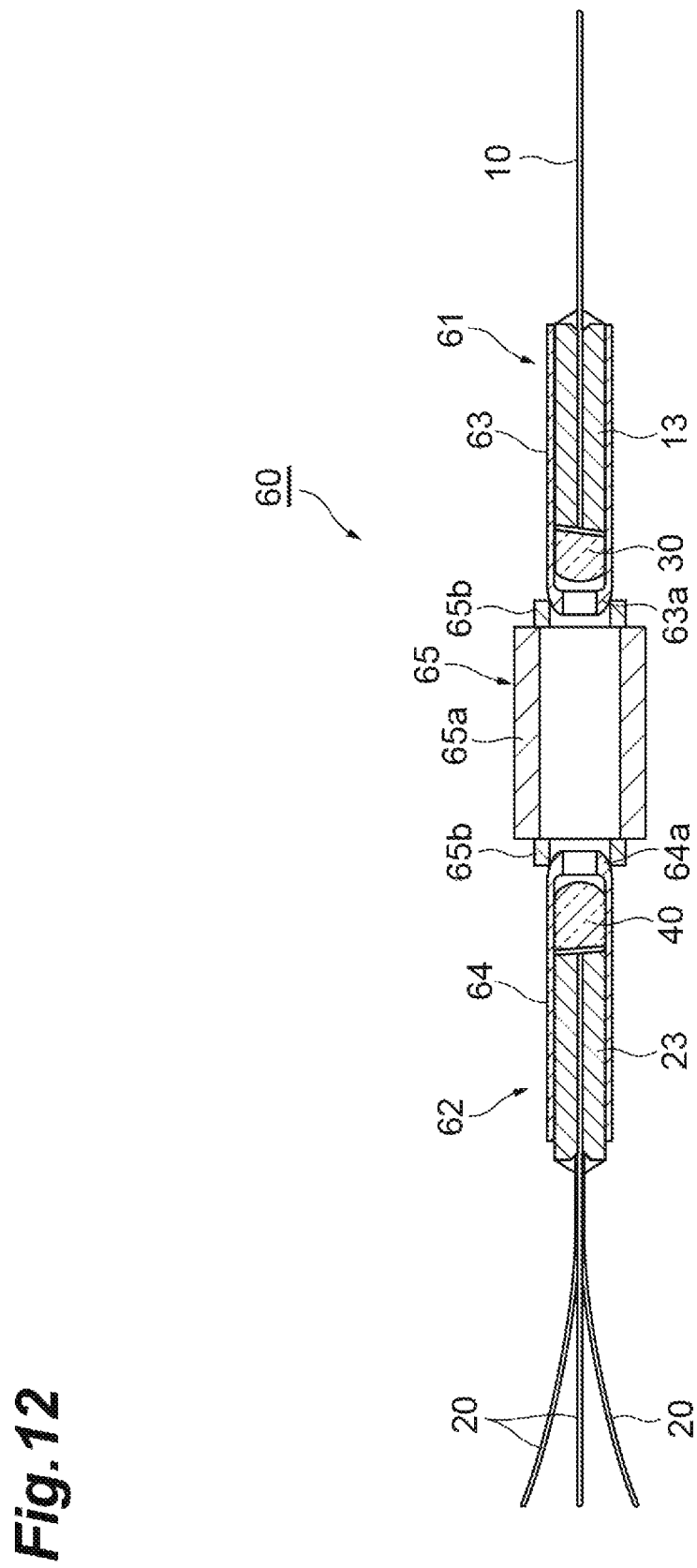
FIG. 12 is a cross-sectional view of the optical fiber connection structure of FIG. 11.

FIG. 11 is a perspective view illustrating an optical fiber connection structure 60 according to a modified example, and FIG. 12 is a cross-sectional view illustrating the optical fiber connection structure 60. As illustrated in FIGS. 11 and 12, the optical fiber connection structure 60 includes a first collimator 61, a second collimator 62, and a metal tube 65. The first collimator 61 is different from the first collimator 51 in that the first collimator 61 has a sleeve 63 having a shape different from the sleeve 53, and the second collimator 62 is different from the second collimator 52 in that the second collimator 62 has a sleeve 64 having a shape different from the sleeve 54.

The sleeve 63 includes an insertion portion 63a entering the metal tube 65, and an outer diameter of the insertion portion 63a is reduced, and an inner surface of the insertion portion 63a protrudes inward in a radial direction of the sleeve 63. The sleeve 64 also includes an insertion portion 64a similar to the insertion portion 63a. The metal tube 65 has a tubular main body portion 65a and an annular inserted portion 65b connected to each of one end and the other end in of the main body portion 65a in the axial direction.

With respect to a method for assembling the optical fiber connection structure 60, first, the first collimator 61, the second collimator 62, and the metal tube 65 are prepared. It is noted that the main body portion 65a and the inserted portion 65b are separate bodies before the assembling. One of the first collimator 61 and the second collimator 62, the one inserted portion 65b, and the main body portion 65a are fixed to each other by welding. Then, the other of the first collimator 61 and the second collimator 62 and the other inserted portion 65b are center-aligned in the X direction, the Y direction, the Z direction, the θx direction, the θy direction, and the θz direction and, after that, fixed to the main body portion 65a by welding. The welding is performed, for example, by irradiation with a YAG laser.

Figure 13:
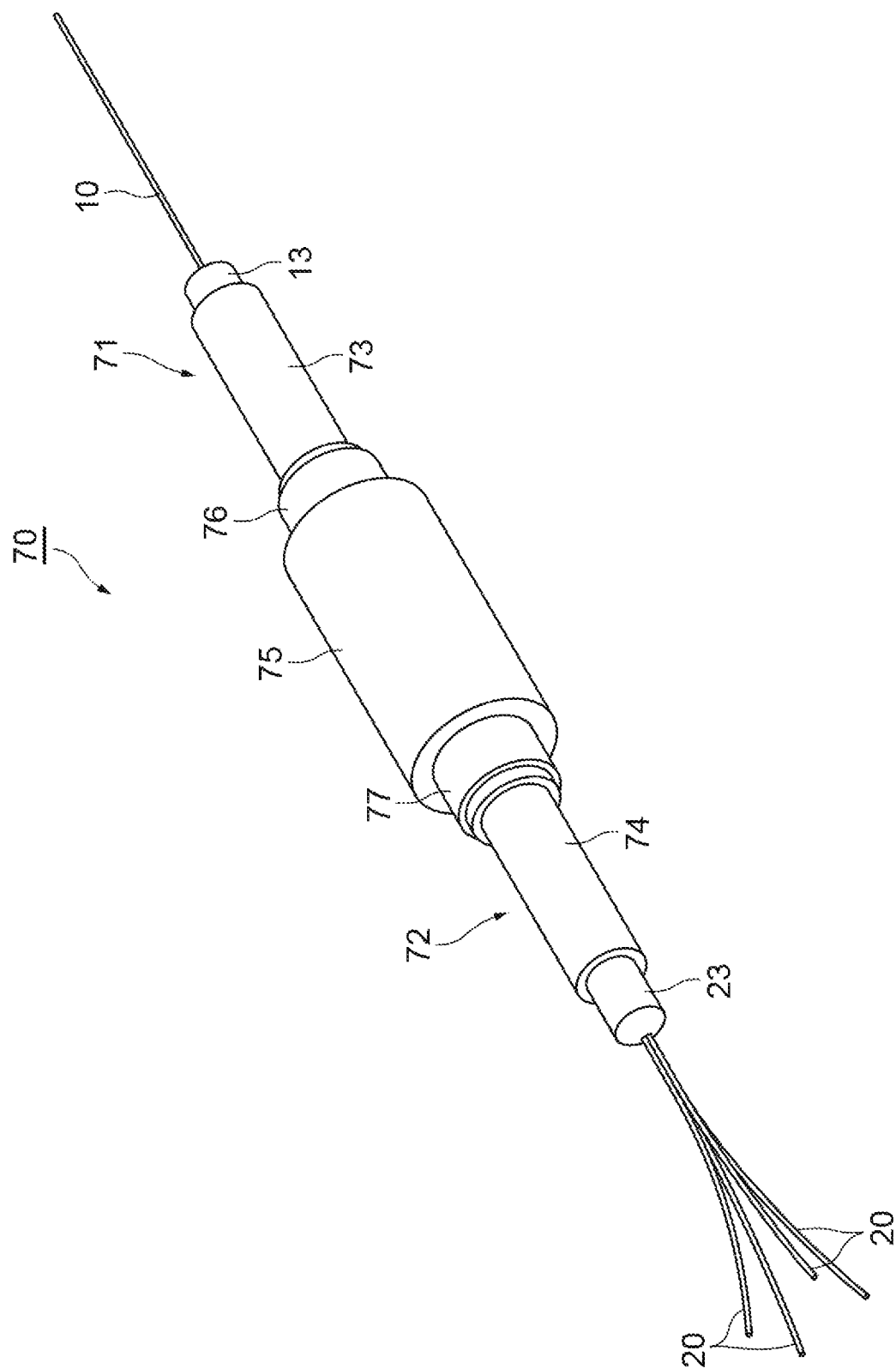
FIG. 13 is a perspective view illustrating still another example of the assembled optical fiber connection structure.
Figure 14:
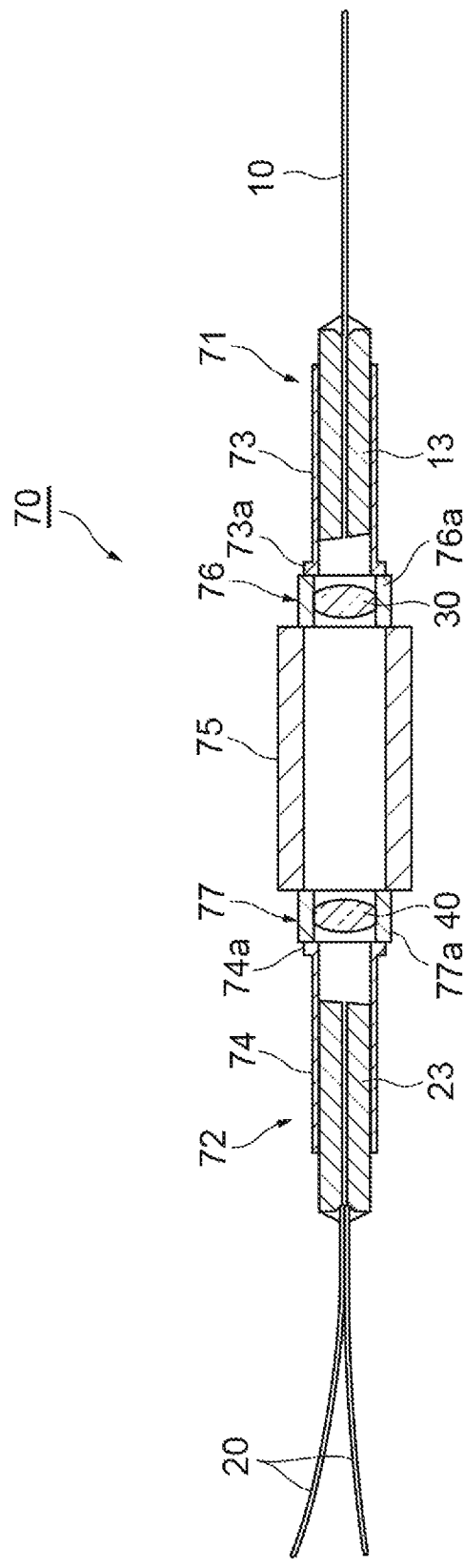
FIG. 14 is a cross-sectional view of the optical fiber connection structure of FIG. 13.

FIG. 13 is a perspective view illustrating an optical fiber connection structure 70 according to another modified example, and FIG. 14 is a cross-sectional view illustrating the optical fiber connection structure 70. As illustrated in FIGS. 13 and 14, the optical fiber connection structure 70 includes a first optical fiber (MCF) unit 71, a second optical fiber (SCF) unit 72, a metal tube 75, a first lens unit 76 including the first lens 30, and a second lens unit 77 including the second lens 40.

This modified example is different from the examples illustrated in FIGS. 11 and 12, in that the former first optical fiber unit 71 does not have the first lens 30 and in that the former first optical fiber unit 71 has the sleeve 73 having a shape different from that of the sleeve 53. The second optical fiber unit 72 is also different in that the second optical fiber unit 72 does not have the second lens 40 and in that second optical fiber unit 72 has the sleeve 74 having a shape different from that of the sleeve 54.

The sleeve 73 includes a flange portion 73a at one end in the axial direction. The sleeve 74 also has a flange portion 74a similar to the flange portion 73a. The flange portion 73a and the flange portion 74a correspond to portions fixed to the first lens unit 76 and the second lens unit 77, respectively. For example, the first lens unit 76 includes the first lens 30 and a tubular lens holding member 76a surrounding and holding the first lens 30. The second lens unit 77 includes the second lens 40 and a tubular lens holding member 77a surrounding and holding the second lens 40.

The method for assembling the optical fiber connection structure 70 is described. First, the first optical fiber unit 71, the second optical fiber unit 72, the metal tube 75, the first lens unit 76, and the second lens unit 77 are prepared. Herein, the first optical fiber unit 71 refers to an aggregate of the MCF 10, the ferrule 13 terminating the MCF 10, and the sleeve 73 surrounding the ferrule 13. The second optical fiber unit 72 refers to an aggregate of the plurality of SCFs 20, the ferrule 23 terminating the SCFs 20, and the sleeve 74 surrounding the ferrule 23. It is noted that the ferrules 13 and 23 can be moved in the optical axial direction inside the sleeves 73 and 74, respectively. As the result, the distance between each optical fiber (MCF 10, the plurality of SCFs 20) and the corresponding lens (first lens, second lens) can be changed. Then, one of the first optical fiber unit 71 and the second optical fiber unit 72, and one of the first lens unit 76 and the second lens unit 77 facing the one are fixed to one opening (one end of the metal tube 75 in the axial direction) of the metal tube 75 by welding. Herein, in the first optical fiber unit 71, the first lens unit 76, and the metal tube 75, adjacent ones are separately fixed to each other by welding.

The second lens unit 77 and the ferrule 23 are position-aligned with respect to the integrated first optical fiber unit 71, the first lens unit 76, and the metal tube 75, respectively. The second lens unit 77 is center-aligned in each of the X direction and the Y direction. The ferrule 23 is center-aligned in each of the X direction, the Y direction, the Z direction, and the θz direction. When the center-aligning is completed, the metal tube 75 and the second lens unit 77 are fixed by welding. After that, the ferrule 23 is center-aligned again in each of the X direction, the Y direction, the Z direction, and the θz direction, and after that, the ferrule 23 is fixed to the sleeve 74 by welding. Next, the ferrule 23 fixed to the sleeve 74 is center-aligned in each of the X direction, the Y direction, and the θz direction and, after that, fixed to the second lens unit 77 by welding. The welding is performed, for example, by irradiation with a YAG laser.

Next, the functions and effects obtained from the optical fiber connection structure according to the embodiment are described. In the optical fiber connection structure 1, the pitch of each core 11 of the MCF 10 is P1, and the MFD of each core 11 of the MCF 10 is MFD1 (μm). The pitch of each core 21 of the SCF 20 is P2, and the MFD of each core 21 of the SCF 20 is MFD2 (μm). Assuming that the focal length of the first lens 30 facing the MCF 10 is set to f1 (mm) and the focal length of the second lens 40 facing the SCF 20 is set to f2 (mm), (f1/f2) is within ±10% of (P1/P2). And (MFD1/MFD2) is within ±10% of (P1/P2).

Therefore, since magnification conversion of the lens and the MFD is performed together with the core pitch, the mismatch of the MFD between the MCF 10 and the SCF 20 can be corrected. Therefore, optical loss can be reduced. Further, since the optical fiber connection structure 1 includes the MCF 10, the plurality of SCFs 20, the first lens 30, and the second lens 40, special parts such as a deflection prism or a lens array cannot be required. Therefore, an increase in the number of parts can be suppressed, and miniaturization can be realized.

Each of the plurality of SCFs 20 may have the beam expansion portion 15 on the second end face 24 facing the second lens 40. In this case, since an MFD of a light beam propagating through the core 21 of each SCF 20 is expanded on an emission face of each SCF 20, a value of the MFD2 is increased according to the expanded light beam L from the second lens 40, so that the optical loss can be reduced.

Each of the plurality of SCFs 20 may have the MFD expansion portion 25 having an expanded MFD on the second end face 24 facing the second lens 40. In this case, since the MFD of core 21 is expanded on the second end face 24 of each SCF 20, the value of the MFD2 is increased according to the expanded light beam L from the second lens 40, so that the optical loss can be reduced.

The beam expansion portion may be the GRIN lens 26 or the GI fiber spliced to each SCF 20. In this case, the end face of the GRIN lens 26 or the GI fiber on the side not spliced to each SCF 20 is an emission face of each SCF and becomes the emission end. When the outer diameter of the GRIN lens 26 or the GI fiber matches the outer diameter of the SCF 20, splicing of the GRIN lens 26 or the GI fiber to the SCF 20 can be easily performed.

The beam expansion portion may be the optical fiber 27 having the core 27a having a diameter larger than that of the core 21 of the SCF 20, and the core may be expanded from the SCF 20 toward the optical fiber 27 in the region including the interface between the SCF 20 and the optical fiber 27. In this case, the end face of the optical fiber 27 having the core 27a having a diameter larger than that of the core 21 of the SCF 20 and being not connected to the SCF 20 is an emission face of each SCF and becomes an emission end.

The normal line H2 of the emission face of the SCF 20 may be inclined with respect to the optical axial direction D of the SCF 20, and the normal line H1 of the first end face 14 facing the first lens 30 of the MCF 10 may be inclined with respect to the optical axial direction D. As described above, when the first lens and the second lens have the same refractive index and the inclination angle of the normal line H1 of the first end face 14 of the MCF 10 with respect to the optical axial direction D is θ1 and the inclination angle of the normal line H2 of the emission face of the SCF 20 with respect to the optical axial direction D is θ2, the above-mentioned formula may be satisfied.

$$(f1/f2) \times 0.8 \leq \theta 2/\theta 1 \leq (f1/f2) \times 1.2 \quad (3)$$

In this case, the optical axes of both the SCF 20 and the MCF 10 can be close to each other in parallel.

The first lens and the second lens may be the first lens 30A and the second lens 40A, which are plano-convex lenses having curved surfaces facing each other. In this case, the inexpensive plano-convex lens can be used, and the assembling can be easily performed.

The first lens and the second lens may be the first lens 30B and the second lens 40B, which are GRIN lenses. In this case, by using the GRIN lens having a planar shape, there is an advantage that a handling and assembling can be easily performed.

The first lens and the second lens may be aspherical lenses. In this case, the coupling can be performed with lower loss.

Each of the plurality of SCFs 20 may have a reduced diameter. In this case, a magnification rate of the second lens 40 can be lower by using the SCF 20 having a small diameter in advance or using the SCF 20 having a small diameter by a chemical etching or the like.

Similarly to the optical fiber connection structure 50 described above, the optical fiber connection structure may include the first collimator 51 in which the MCF 10 and the first lens 30 are integrated, the second collimator 52 in which the plurality of SCFs 20 and the second lens 40 are integrated, and the tubular member 55 into which the first collimator 51 and the second collimator 52 are inserted so that the first lens 30 and the second lens 40 face each other. The first collimator 51 and the second collimator 52 may be fixed to the tubular member 55 with adhesive in a state of being inserted into the tubular member 55.

Similarly to the optical fiber connection structure 60 described above, the optical fiber connection structure may include the first collimator 61 in which the MCF 10 and the first lens 30 are integrated, the second collimator 62 in which the plurality of SCFs 20 and the second lens 40 are integrated, and the metal tube 65 which fixes the first collimator 61 and the second collimator 62 by welding so that the first lens 30 and the second lens 40 face each other.

Similarly to the above-mentioned optical fiber connection structure 70, the optical fiber connection structure may include the first optical fiber unit 71 having the MCF 10, the second optical fiber unit 72 having the plurality of SCFs 20, the first lens unit 76 including the first lens 30 and being fixed to the optical fiber unit 71 by welding, the second lens unit 77 including the second lens 40 and being fixed to the second optical fiber unit 72 by welding, and the metal tube 75 fixing the first lens unit 76 and the second lens unit 77 by welding so that the first lens unit 76 and the second lens units 77 face each other.

Figure 15:
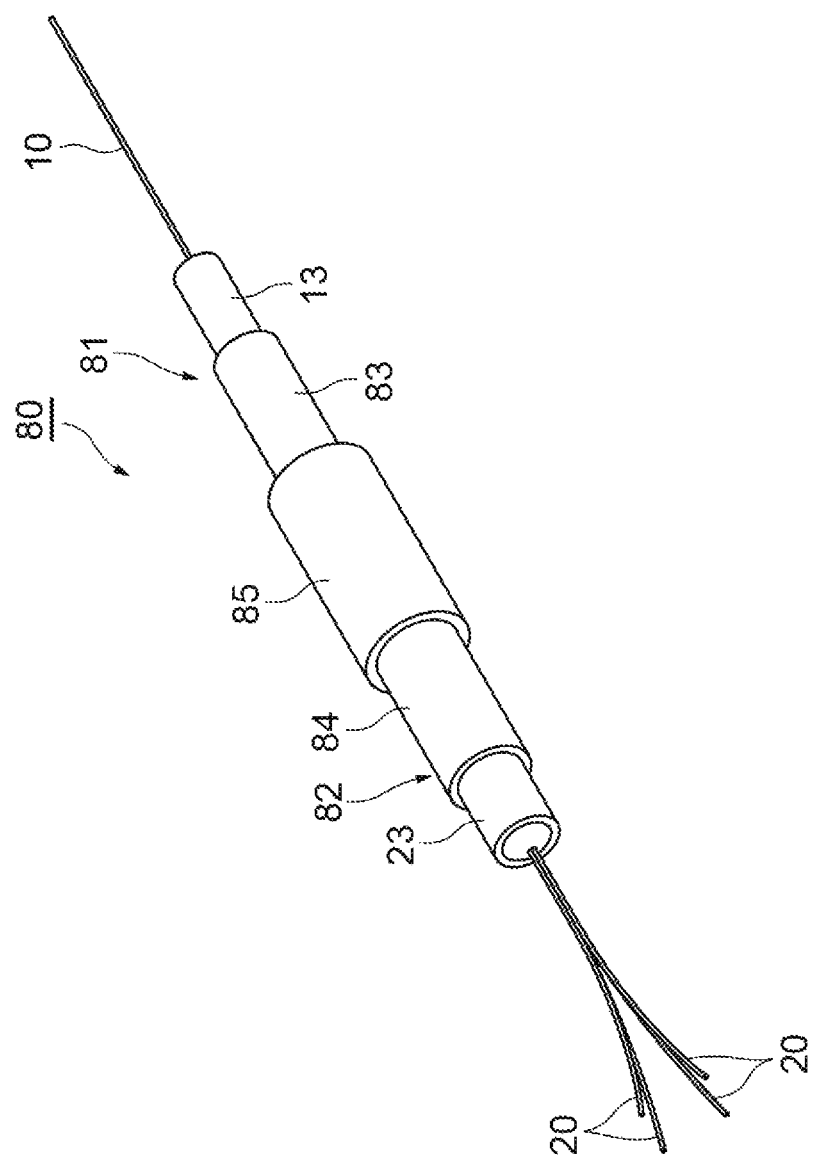
FIG. 15 is a perspective view of an optical fiber connection structure according to a modified example.
Figure 16:
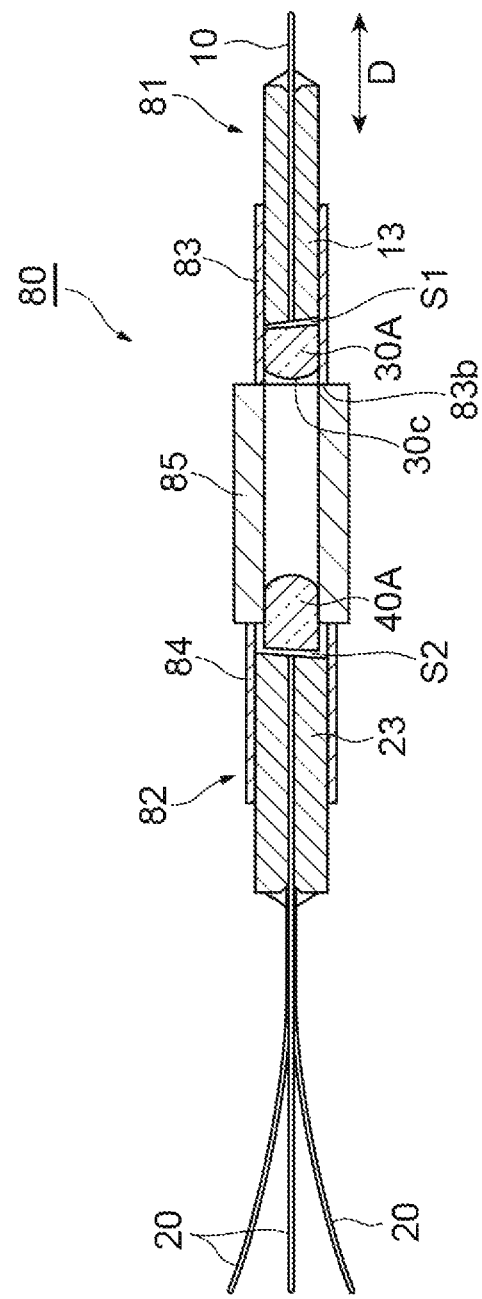
FIG. 16 is a cross-sectional view of the optical fiber connection structure of FIG. 15.

FIG. 15 is a perspective view illustrating an optical fiber connection structure 80 according to a modified example. FIG. 16 is a cross-sectional view illustrating the optical fiber connection structure 80. As illustrated in FIGS. 15 and 16, the optical fiber connection structure 80 includes a first collimator 81, a second collimator 82, and a tubular member 85. The tubular member 85 is made of, for example, glass. The tubular member 85 fixes the first collimator 81 and the second collimator 82 so that the first lens 30A and the second lens 40A face each other.

The first collimator 81 includes an MCF 10, a ferrule 13 (first ferrule) terminating the MCF 10, a first lens 30A facing the ferrule 13 via a gap S1, and a first sleeve 83 internally holding the first lens 30A and the ferrule 13. The second collimator 82 includes a plurality of SCFs 20, a ferrule 23 (second ferrule) terminating the plurality of SCFs 20, a second lens 40A facing the ferrule 23 via a gap S2, and a second sleeve 84 internally holding the second lens 40A and the ferrule 23.

The ferrule 13 and the first sleeve 83 are made of, for example, glass. The first lens 30A is, for example, a tip spherical rod lens which has a spherical surface on one side and angled flat surface on the other side. The outer diameter of the first lens 30A is substantially the same as the outer diameter of the ferrule 13. An inner diameter of the first sleeve 83 is slightly larger than the outer diameter of the first lens 30A and the outer diameter of the ferrule 13. For example, a gap of 0 µm or more and 20 µm or less is formed between each of an outer peripheral surface of the first lens 30A and an outer peripheral surface of the ferrule 13 and an inner peripheral surface of the first sleeve 83. An end face 30c of the first lens 30A facing the tubular member 85 enters an inside of the first sleeve 83 rather than an end face 83b of the first sleeve 83 facing the tubular member 85. Accordingly, when the first collimator 81 is center-aligned with the tubular member 85 in an XY direction, the first lens 30A can be prevented from interfering with the tubular member 85.

For example, the ferrule 23 and the second sleeve 84 are made of glass, and the second lens 40A is a tip spherical rod lens. A portion of the second lens 40A is inserted into an inside of the tubular member 85. An outer diameter of the second lens 40A is slightly smaller than an inner diameter of the tubular member 85, smaller than an outer diameter of the ferrule 23, and smaller than an inner diameter of the second sleeve 84. The outer diameter of the ferrule 23 is larger than the inner diameter of the tubular member 85 and slightly smaller than the inner diameter of the second sleeve 84.

Figure 17:
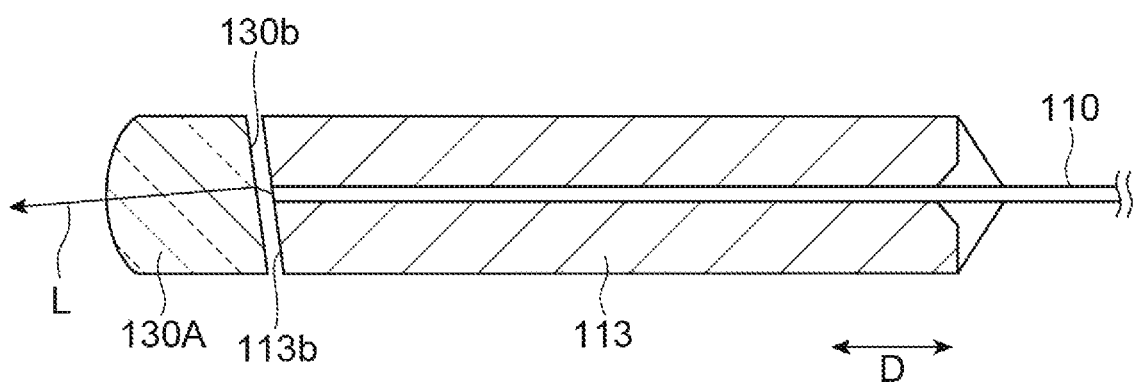
FIG. 17 is a cross-sectional view illustrating a ferrule and a lens according to a comparative example.
Figure 18:
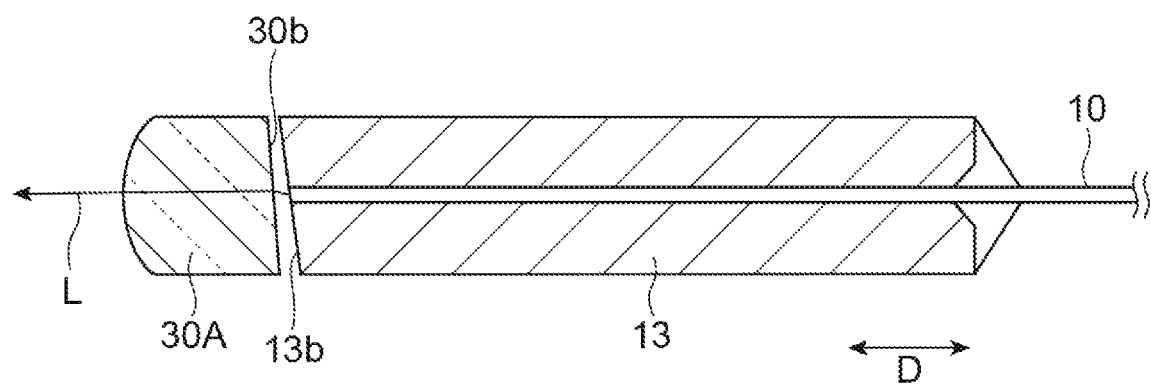
FIG. 18 is a cross-sectional view illustrating a ferrule and a lens of the optical fiber connection structure of FIG. 15.

A length of the gap S1 formed between the MCF 10 (ferrule 13) and the first lens 30A is adjusted so that a light beam propagating between the first lens 30A and the second lens 40A becomes a collimated light beam. FIG. 18 is a diagram illustrating the MCF 10, the ferrule 13, and the first lens 30A according to this modified example, and FIG. 17 is a diagram illustrating an MCF 110, a ferrule 113, and a first lens 130A according to a comparative example.

By the way, in some cases, a refractive index of the first lens 130A is different from a refractive index of the MCF 110, and is, for example, higher than the refractive index of the MCF 110. At this time, as illustrated in FIG. 17, when an end face 113b (a distal end face of the MCF 110) of the ferrule 113 facing the first lens 130A and a plane 130b of the first lens 130A facing the ferrule 113 are parallel to each other, a light beam L output from the MCF 110 may be inclined from the optical axial direction D (the longitudinal direction) of the MCF 110 in the first lens 130A. On the other hand, as illustrated in FIG. 18, when an end face 13b (a distal end face of the MCF 10) of the ferrule 13 facing the first lens 30A and a plane 30b of the first lens 30A facing the ferrule 13 are not parallel to each other, a light beam L output from the MCF 10 is output in parallel to the optical axial direction D in the first lens 30A. As the result, since the light beam L is output from the first lens 30A toward the second lens 40A in parallel to the optical axial direction D, the optical coupling loss can be reduced. When a refractive index of the first lens 30A is higher than a refractive index of the MCF 10, the inclination angle of the end face 13b of the ferrule 13 with respect to the plane perpendicular to the optical axial direction D is larger than the inclination angle of the plane 30b of the first lens 30A with respect to the plane perpendicular to the optical axial direction D. It is noted that the end face of the ferrule 23 facing the second lens 40A and the plane of the second lens 40A facing the ferrule 23 may not be in parallel to each other. Also in this case, the same functions and effects as the effects of the first lens 30A and the ferrule 13 described above can be obtained.

Figure 19:
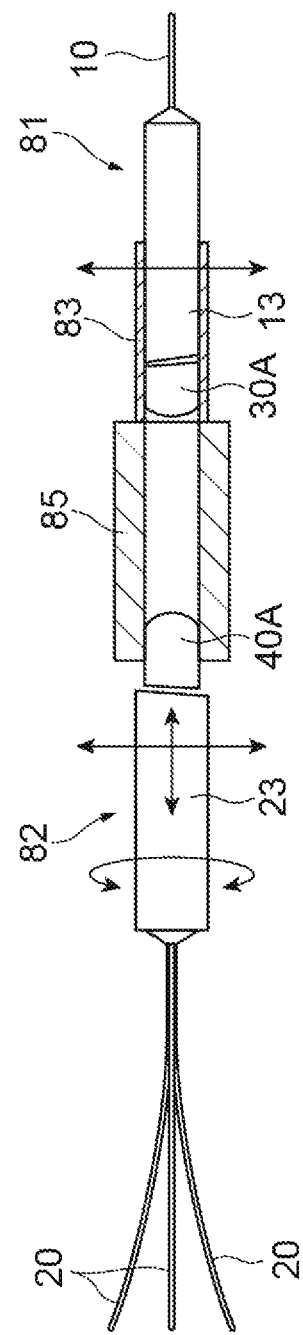
FIG. 19 is a diagram for explaining a method for assembling the optical fiber connection structure of FIG. 15.

Next, a method for assembling the optical fiber connection structure 80 is described. As illustrated in FIG. 19, the second lens 40A is fixed to the tubular member 85. Specifically, a spherical portion of the second lens 40A is inserted into the tubular member 85, and the second lens 40A inserted into the tubular member 85 is fixed to the tubular member 85 with adhesive. Further, the first collimator 81 is manufactured by inserting the first lens 30A and the ferrule 13 into the first sleeve 83 and fixing to the first sleeve 83 with adhesive. Then, the first collimator 81 is center-aligned with the second lens 40A fixed to the tubular member 85. For example, the first collimator 81 is center-aligned in each of the X direction and the Y direction, and after the center-aligning, the end portion of the tubular member 85 and the end portion of the first sleeve 83 are fixed with adhesive, and the first collimator 81 is fixed to the tubular member 85.

As illustrated in FIG. 20, the second collimator 82 is center-aligned in each of the X direction, the Y direction, the Z direction, and the θz direction. When the second collimator 82 is center-aligned in each of the X direction and the Y direction, the ferrule 23 and the second sleeve 84 move together. When the second collimator 82 is center-aligned in each of the Z direction and the θz direction, for example, the ferrule 23 slides inside the second sleeve 84. After the second collimator 82 is center-aligned, the ferrule 23 is fixed to the second sleeve 84 with adhesive, and the end portion of the second sleeve 84 and the end portion of the tubular member 85 are fixed with adhesive. Through the above-described processes, the optical fiber connection structure 80 is completed.

As described above, as illustrated in FIG. 16, in the optical fiber connection structure 80, the end face 30c of the first lens 30A facing the tubular member 85 enters an inside of the first sleeve 83 rather than the end face 83b of the first sleeve 83 facing the tubular member 85. That is, the first lens 30A enters the inside of the first sleeve 83. Therefore, when center-aligning the first collimator 81 with respect to the tubular member 85, the first lens 30A can be allowed not to be in contact with the tubular member 85.

As illustrated in FIG. 18, the inclination angle of the end face 13b of the ferrule 13 with respect to the plane perpendicular to the optical axial direction D (longitudinal direction) is different from the inclination angle of the plane 30b (the plane 30b facing the ferrule 13) of the first lens 30A with respect to the plane perpendicular to the optical axial direction D, and the light beam L is output from the first lens 30A toward the second lens 40A in parallel to the optical axial direction D. Therefore, the coupling loss of light beam L can be reduced. The inclination angle of the end face of the ferrule 23 with respect to the plane perpendicular to the optical axial direction D is different from the inclination angle of the plane of the second lens 40A with respect to the plane perpendicular to the optical axial direction D, and a light beam may be output from the second lens 40A toward the first lens 30A in parallel to the optical axial direction D. In this case, the same functions and effects as described above can be obtained. Further, the outer diameter of the ferrule 23 is larger than the outer diameter of the second lens 40A. In this case, the second sleeve 84 and the ferrule 23 can be moved in the X direction and the Y direction with respect to the second lens 40A fixed to the tubular member 85.

Although the optical fiber connection structure 80 is described above, the configuration of the optical fiber connection structure 80 can be further modified. For example, in the optical fiber connection structure 80, the ferrule 13 inserted into the first sleeve 83 of the first collimator 81 terminates the MCF 10, and the ferrule 23 inserted into the second sleeve 84 of the second collimator 82 terminates the plurality of SCFs 20. However, the ferrule 13 of the first collimator 81 may terminate the plurality of SCFs, and the ferrule 23 of the second collimator 82 may terminate the MCF. That is, the type of optical fiber terminated by the ferrule is not particularly limited.

The embodiments and modified examples of the optical fiber connection structures according to the present disclosure have been described above. However, the present invention is not limited to the above-described embodiments or modified examples. That is, it is easily recognized by those skilled in the art that the present invention can be modified and changed in various forms within the scope of the spirit described in the claims. For example, a shape, size, material, number, and arrangement of each component of the optical fiber connection structure can be changed as appropriate within the scope of the spirit. For example, in the above-described embodiment, the example in which the normal line H1 of the first end face 14 of the MCF 10 and the normal line H2 of the second end face 24 of the SCF 20 are inclined with respect to the optical axial direction D is described. However, at least one of the normal line of the first end face of the MCF and the normal line of the second end face of the SCF may not be inclined with respect to the optical axial direction. In this manner, the direction of the distal end face can be changed as appropriate.

REFERENCE SIGNS LIST 1, 1A, 1B, 50, 60, 70: optical fiber connection structure, 10: MCF (multi-core fiber), 11: core, 12: cladding, 13: ferrule (first ferrule), 14: first end face, 15: beam expansion portion, 20: SCF (single-core fiber), 20A: TEC fiber, 21: core, 22: cladding, 23: ferrule (second ferrule), 24: second end face, 25: MFD expansion portion, 25a: tapered portion, 26: GRIN lens, 27: optical fiber, 27a: core, 30, 30A, 30B: first lens, 40, 40A, 40B: second lens, 51, 61: first collimator, 52, 62: second collimator, 53, 54, 63, 64, 73, 74: sleeve, 55: tubular member, 63a, 64a: insertion portion, 64a: insertion portion, 65, 75: metal tube, 65a: main body portion, 65b: inserted portion, 71: first optical fiber unit, 72: second optical fiber unit, 73a, 74a: flange portion, 76: first lens unit, 76a, 77a: lens holding member, 77: second lens unit, 80: optical fiber connection structure, 81: first collimator, 82: second collimator, 83: first sleeve, 83b: end face, 84: second sleeve, 85: tubular member, D: optical axial direction, H1, H2: normal line, L: light beam, θ1, θ2: angle.

The invention claimed is:

1. An optical fiber connection structure comprising:
a multi-core fiber;
a plurality of single-core fibers arranged in parallel in a direction perpendicular to a longitudinal direction;
a first lens facing a first end face which is a distal end face of the multi-core fiber and having a focal length of f1 (mm); and
a second lens arranged between second end faces which are distal end faces of the plurality of single-core fibers and the first lens and having a focal length of f2 (mm),
wherein arrangement of a center position of each core in a cross section perpendicular to the longitudinal direction of the multi-core fiber and arrangement of a center position of each core in a cross section perpendicular to the longitudinal direction of the plurality of single-core fibers are disposed so as to have similar shapes,
wherein a pitch of a set of cores of the multi-core fiber is P1 (μm), and an MFD of a light beam having a specific wavelength on the first end face of each core is MFD1 (μm),
wherein a pitch of a set of cores of the plurality of single-core fibers at positions corresponding to the set of cores of the multi-core fiber is P2 (μm), and an MFD of a light beam having the specific wavelength on the second end face of each core is MFD2 (μm),
wherein each of the plurality of single-core fibers has a beam expansion portion capable of expanding the MFD of a light beam propagating in the core toward the second end face on the second end face,
wherein the beam expansion portion is an MFD expansion portion in which an MFD of each of the single-core fibers is expanded, and wherein P2 is greater than P1, f2 is greater than f1, and MFD2 is greater than MFD1, and the following formulas are satisfied:

$(P1/P2) \times 0.9 \le f1/f2 \le (P1/P2) \times 1.1$, and $(P1/P2) \times 0.9 \le MFD1/MFD2 \le (P1/P2) \times 1.1$.

2. An optical fiber connection structure comprising:
a multi-core fiber;
a plurality of single-core fibers arranged in parallel in a direction perpendicular to a longitudinal direction;
a first lens facing a first end face which is a distal end face of the multi-core fiber and having a focal length of f1 (mm); and
a second lens arranged between second end faces which are distal end faces of the plurality of single-core fibers and the first lens and having a focal length of f2 (mm),
wherein arrangement of a center position of each core in a cross section perpendicular to the longitudinal direction of the multi-core fiber and arrangement of a center position of each core in a cross section perpendicular to the longitudinal direction of the plurality of single-core fibers are disposed so as to have similar shapes,
wherein a pitch of a set of cores of the multi-core fiber is P1 (μm), and an MFD of a light beam having a specific wavelength on the first end face of each core is MFD1 (μm),
wherein a pitch of a set of cores of the plurality of single-core fibers at positions corresponding to the set of cores of the multi-core fiber is P2 (μm), and an MFD of a light beam having the specific wavelength on the second end face of each core is MFD2 (μm),
wherein each of the plurality of single-core fibers has a beam expansion portion capable of expanding the MFD of a light beam propagating in the core toward the second end face on the second end face,
wherein the beam expansion portion is an optical fiber having a core with larger MFD than that of the core of the single-core fiber,
wherein the MFD is expanded from the single-core fiber toward the optical fiber in a region including an interface between the single-core fiber and the optical fiber, and
wherein P2 is greater than P1, f2 is greater than f1, and MFD2 is greater than MFD1, and the following formulas are satisfied:

$(P1/P2) \times 0.9 \le f1/f2 \le (P1/P2) \times 1.1$, and $(P1/P2) \times 0.9 \le MFD1/MFD2 \le (P1/P2) \times 1.1$.

3. The optical fiber connection structure according to claim 1,
wherein the first lens and the second lens have the same refractive index,
wherein a normal line of the second end face is inclined with respect to an optical axial direction of the single-core fiber,
wherein a normal line of the first end face is inclined with respect to the optical axial direction,
wherein, when an inclination angle of the normal line of the first end face with respect to the optical axial direction is θ1, and an inclination angle of the normal line of the second end face with respect to the optical axial direction is θ2, the following formula is satisfied:

$(f1/f2) \times 0.8 \le \theta2/\theta1 \le (f1/f2) \times 1.2$.

4. The optical fiber connection structure according to claim 1, wherein the first lens and the second lens are plano-convex lenses having curved surfaces facing each other.

5. The optical fiber connection structure according to claim 1, wherein the first lens and the second lens are GRIN lenses.

6. The optical fiber connection structure according to claim 1, wherein the first lens and the second lens are aspherical lenses.

7. The optical fiber connection structure according to claim 1, wherein an outer diameter of each of the single-core fibers on the second end face is smaller than the outer diameter of each of the single-core fibers on an end face on a side opposite to the second end face.

8. The optical fiber connection structure according to claim 1, comprising:
a first collimator in which the multi-core fiber and the first lens are integrated;
a second collimator in which the plurality of single-core fibers and the second lens are integrated; and
a tubular member into which the first collimator and the second collimator are inserted so that the first lens and the second lens face each other,
wherein the first collimator and the second collimator are fixed to the tubular member with adhesive in a state of being inserted into the tubular member.

9. The optical fiber connection structure according to claim 1, comprising:
a first collimator in which the multi-core fiber and the first lens are integrated;
a second collimator in which the plurality of single-core fibers and the second lens are integrated; and
a metal tube fixing the first collimator and the second collimator by welding so that the first lens and the second lens face each other.

10. The optical fiber connection structure according to claim 1, comprising:
a first optical fiber unit having the multi-core fiber;
a second optical fiber unit having the plurality of single-core fibers;
a first lens unit including the first lens and being fixed to the first optical fiber unit by welding;
a second lens unit including the second lens and being fixed to the second optical fiber unit by welding; and
a metal tube fixing the first lens unit and the second lens unit by welding so that the first lens unit and the second lens unit face each other.

11. The optical fiber connection structure according to claim 1, comprising:
a first collimator having the first lens, a first ferrule terminating the multi-core fiber, and a first sleeve internally holding the first lens and the first ferrule;
a second collimator having the second lens, a second ferrule terminating the plurality of single-core fibers, and a second sleeve internally holding the second lens and the second ferrule; and
a tubular member fixing the first collimator and the second collimator so that the first lens and the second lens face each other,
wherein the end portion of the first sleeve and one end portion of the tubular member are fixed, and the end portion of the second sleeve and the other end portion of the tubular member are fixed.

12. The optical fiber connection structure according to claim 11, wherein an end face of the first lens facing the tubular member enters an inside of the first sleeve rather than an end face of the first sleeve facing the tubular member.

13. The optical fiber connection structure according to claim 11,
wherein an inclination angle of the end face of the first ferrule of the first collimator with respect to a plane perpendicular to the longitudinal direction is different from an inclination angle of a plane of the first lens facing the first ferrule with respect to the plane perpendicular to the longitudinal direction, and
wherein a light beam is output from the first lens toward the second lens in parallel to the longitudinal direction.

14. The optical fiber connection structure according to claim 11,
wherein an inclination angle of the end face of the second ferrule of the second collimator with respect to a plane perpendicular to the longitudinal direction is different from an inclination angle of a plane of the second lens facing the second ferrule with respect to the plane perpendicular to the longitudinal direction, and
wherein a light beam is output from the second lens toward the first lens in parallel to the longitudinal direction.

15. The optical fiber connection structure according to claim 11, wherein an outer diameter of the second ferrule is larger than an outer diameter of the second lens.

* * * * *